(12) United States Patent
Li et al.

(10) Patent No.: US 11,043,906 B2
(45) Date of Patent: Jun. 22, 2021

(54) BUS BAR STRUCTURE AND POWER CONVERSION APPARATUS USING THE SAME

(71) Applicant: Hitachi Automotive Systems, Ltd., Hitachinaka (JP)

(72) Inventors: Jia Li, Tokyo (JP); Isao Hoda, Tokyo (JP); Yuji Sobu, Ibaraki (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/469,000

(22) PCT Filed: Oct. 17, 2017

(86) PCT No.: PCT/JP2017/037542
§ 371 (c)(1),
(2) Date: Jun. 12, 2019

(87) PCT Pub. No.: WO2018/110071
PCT Pub. Date: Jun. 21, 2018

(65) Prior Publication Data
US 2019/0312522 A1 Oct. 10, 2019

(30) Foreign Application Priority Data

Dec. 13, 2016 (JP) .............................. JP2016-240845

(51) Int. Cl.
*H02M 7/00* (2006.01)
*H02M 1/44* (2007.01)
*H02M 7/5387* (2007.01)

(52) U.S. Cl.
CPC ............. *H02M 7/003* (2013.01); *H02M 1/44* (2013.01); *H02M 7/5387* (2013.01)

(58) Field of Classification Search
CPC ........ H02M 7/003; H02M 7/537; H02M 1/44; H05K 1/0216; H05K 1/0228
See application file for complete search history.

(56) References Cited

U.S. PATENT DOCUMENTS 6,028,779 A * 2/2000 Sakamoto ............. H02M 7/003
363/55
6,259,617 B1 * 7/2001 Wu ........................ H02M 7/003
257/724

(Continued)

FOREIGN PATENT DOCUMENTS

JP      2000-69766 A    3/2000
JP      2005237118 A * 9/2005

(Continued)

OTHER PUBLICATIONS

International Search Report (PCT/ISA/210) issued in PCT Application No. PCT/JP2017/037542 dated Dec. 19, 2017 with English translation (three (3) pages).

(Continued)

*Primary Examiner* — Fred E Finch, III
(74) *Attorney, Agent, or Firm* — Crowell & Moring LLP

(57) ABSTRACT

A power conversion apparatus PWCS includes a smoothing capacitance element Cxp connected between a positive terminal and a negative terminal of a power source and configured to smooth a voltage change superimposed on a DC voltage, a switching circuit SWC converting the DC voltage into an AC voltage, a first bus bar BSB1 configured to electrically connect between the positive terminal of the power source and a terminal TCx1 of the smoothing capacitance element Cxp, a second bus bar BSB2 configured to electrically connect between the negative terminal of the power source and a terminal TCx2 of the smoothing capacitance element Cxp, and a filtering capacitance elements C1 and C2 electrically connected between the first bus bar (Continued)

BSB1 and the second bus bar BSB2. The first bus bar BSB1 and the second bus bar BSB2 include opposing portions and are disposed to allow the current to flow through the opposing portions in the same direction.

11 Claims, 14 Drawing Sheets

(56) References Cited

U.S. PATENT DOCUMENTS

| | | | | |
|---|---|---|---|---|
| 2001/0033477 | A1* | 10/2001 | Inoue | H01L 24/40 361/718 |
| 2007/0090826 | A1* | 4/2007 | Itoh | G01R 15/207 324/117 R |
| 2007/0109715 | A1* | 5/2007 | Azuma | B60L 15/007 361/299.3 |
| 2007/0296271 | A1* | 12/2007 | Torigoe | H02M 1/44 307/10.1 |
| 2008/0230256 | A1* | 9/2008 | Gilliland | H02G 5/00 174/129 B |
| 2009/0290398 | A1* | 11/2009 | Kanie | H05K 7/1432 363/132 |
| 2010/0327949 | A1* | 12/2010 | Gotou | H01L 25/115 327/487 |
| 2011/0242770 | A1* | 10/2011 | Yamanaka | H05K 7/1432 361/728 |
| 2014/0118909 | A1* | 5/2014 | Matsuno | H02M 7/003 361/679.01 |
| 2018/0301984 | A1* | 10/2018 | Okazaki | B60L 50/60 |
| 2019/0036461 | A1* | 1/2019 | Bohmer | H02M 7/003 |
| 2019/0089243 | A1* | 3/2019 | Naito | H02M 7/48 |
| 2019/0319544 | A1* | 10/2019 | Matsuda | H05K 7/04 |
| 2020/0007026 | A1* | 1/2020 | Nishizawa | H02M 7/537 |

FOREIGN PATENT DOCUMENTS

| | | |
|---|---|---|
| JP | 2006-60876 A | 3/2006 |
| JP | 2007-53839 A | 3/2007 |
| JP | 2009-105178 A | 5/2009 |

OTHER PUBLICATIONS

Japanese-language Written Opinion (PCT/ISA/237) issued in PCT Application No. PCT/JP2017/037542 dated Dec. 19, 2017 (three (3) pages).

* cited by examiner

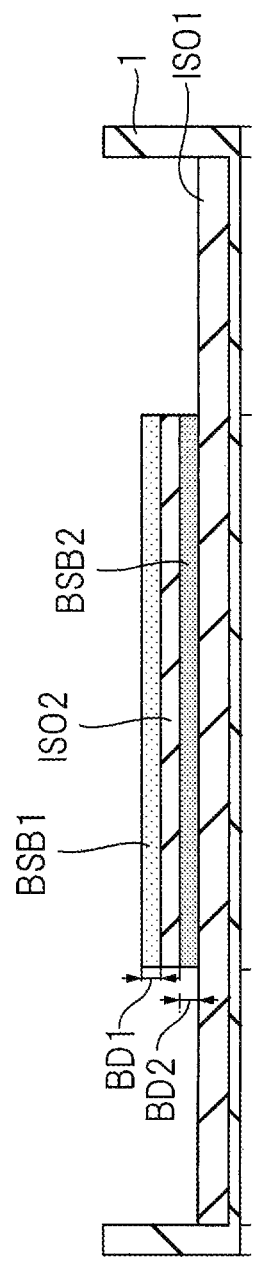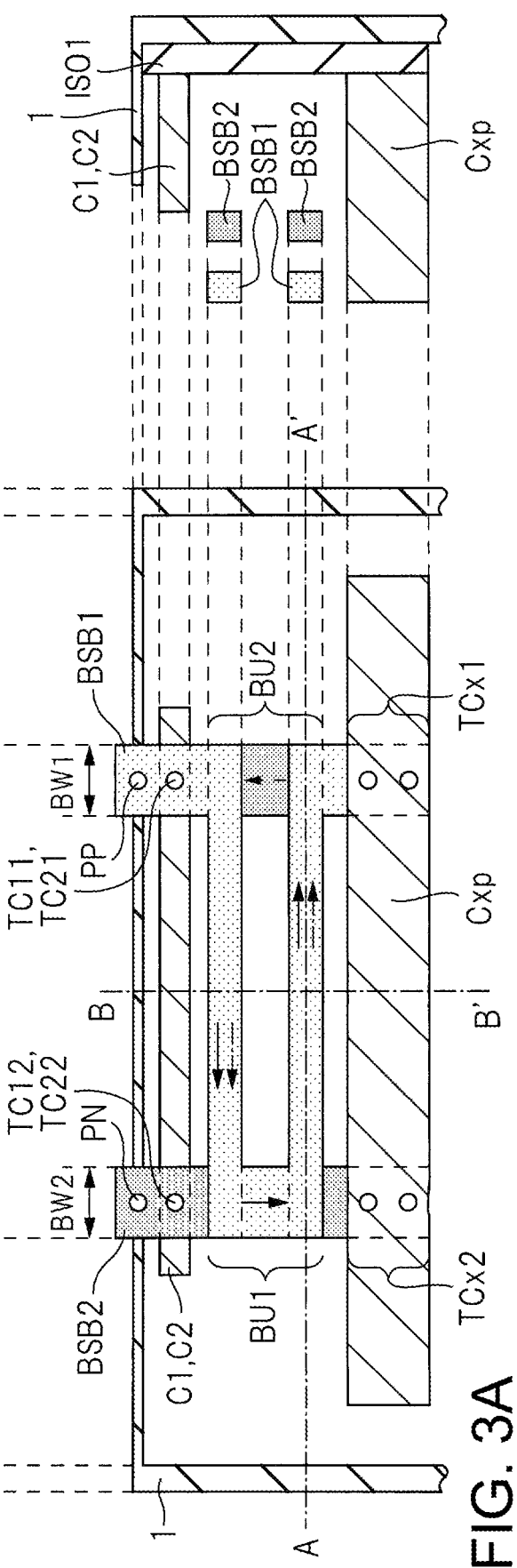

FIG. 4

| # | BUS BAR STRUCTURE | COUPLING COEFFICIENT k2 | INDUCTANCE HLb | EQUIVALENT CIRCUIT |
|---|---|---|---|---|
| 1 | (BSB1(Lb), BSB2(Lb), 70mm × 30mm, 3mm) | 0.814 | 10.4nH | CURRENT FLOWS IN OPPOSITE DIRECTION, AND MUTUAL INDUCTANCE BECOMES NEGATIVE. $HLb = HLp2 + HLn2 - 2 \times k2 \sqrt{HLp2 \cdot HLn2}$ |
| 2 | (BSB1(Lb), BSB2(Lb), 70mm × 30mm, 3mm) | 0.418 | 46.8nH | |
| 3 | (BSB1(Lb), BSB2(Lb), 70mm × 30mm, 3mm) | 0.397 | 52.2nH | CURRENT FLOWS IN THE SAME DIRECTION, AND MUTUAL INDUCTANCE BECOMES POSITIVE. ENTIRE MUTUAL COEFFICIENT DECREASES. |

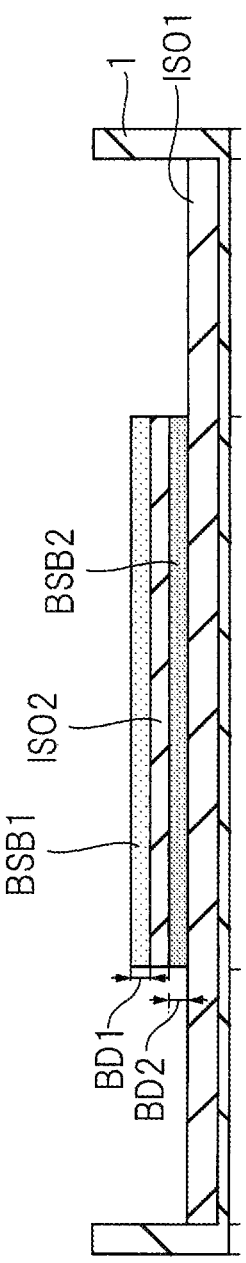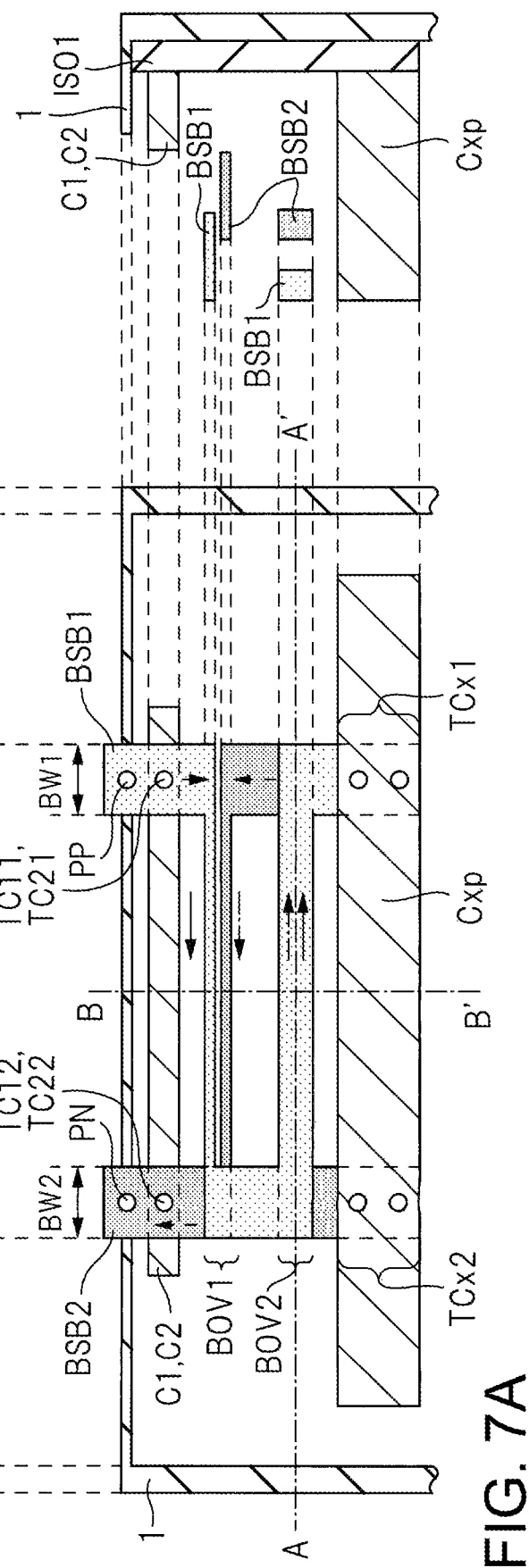

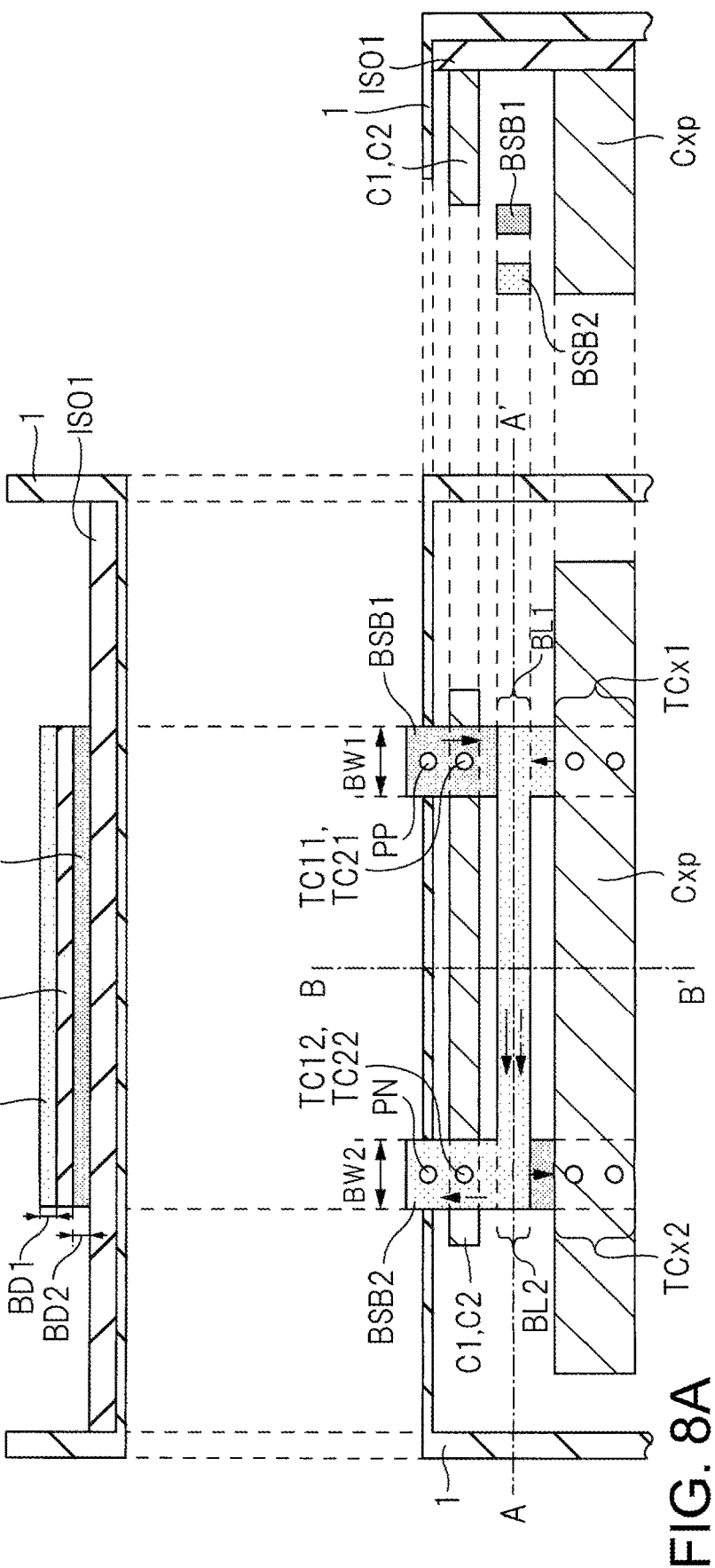

BUS BAR STRUCTURE AND POWER CONVERSION APPARATUS USING THE SAME

TECHNICAL FIELD

The present invention relates to a bus bar structure and a power conversion apparatus using the bus bar structure, such as a power conversion apparatus mounted on an electric vehicle and a bus bar structure used for the power conversion apparatus.

BACKGROUND ART

For example, a power conversion apparatus mounted on an electric vehicle is connected to a high-voltage battery by a cable, and converts a direct-current (DC) voltage supplied from the high-voltage battery into an alternating (AC) voltage to supply power to and rotate an electric motor. To convert a DC voltage to an AC voltage, the power conversion apparatus includes a plurality of switching elements, and switches these switching elements periodically, for example, to convert the DC voltage to the AC voltage. The power conversion apparatus includes a bus bar to supply the DC voltage to the switching elements. The bus bar electrically connects an input terminal of the power source, to which the cable is connected, to the switching elements.

An example power conversion apparatus is described in PTL 1.

CITATION LIST

Patent Literature

PTL 1: JP 2007-53839 A

SUMMARY OF INVENTION

Technical Problem

Switching of the switching elements of the power conversion apparatus fluctuates the voltage/current in the bus bar, and generates electromagnetic noise. The generated electromagnetic noise leaks from the housing of the power conversion apparatus. In other words, high voltage conduction noise is generated.

FIG. 10 is a characteristic diagram illustrating the noise frequency characteristics measured by the inventors of the present invention. In the drawing, the horizontal axis represents frequency and the vertical axis represents peak voltage values of the noise in the frequency. As indicated in the drawing, the noise exists widely in the frequency band. In the frequency band of FIG. 10, an AM broadcast frequency band is from 0.52 to 1.73 MHz and a short wave (SW) frequency band is from 7.1 to 26.1 MHz, for example.

A certain international standard for high voltage conduction noise is scheduled to be established, so that automobile manufacturers tend to establish their own standards complying with international standards. In particular, such standards regulates noise in the AM broadcast frequency band and the SW frequency band, which are used in many applications, to be lower than the other frequency bands.

To analyze the generated noise, the inventors of the present invention have studied the voltage and current transmitting through voltage harness (including cables and a bus bar) connecting between the high-voltage battery and the power conversion apparatus into two types and studied.

FIG. 11 is an explanatory diagram for explaining the study of the inventors. FIGS. 11(A) and 11(B) are block diagrams for explaining the relationship between the high-voltage battery and the power conversion apparatus. FIG. 11(C) illustrates the change in the current flowing through the voltage harness.

In FIG. 11(A), HVBT represents a high-voltage battery, HP represents a positive terminal of the high-voltage battery HVBT, and HN represents a negative terminal. In addition, PWCS represents a power conversion apparatus, PP represents a positive power input terminal (hereinafter also referred to as an input terminal or first power input terminal) of the power conversion apparatus PWCS, and PN represents a negative power input terminal (hereinafter also referred to as an input terminal or a second power source input terminal). A housing of the high-voltage battery HVBT and the power conversion apparatus PWCS is connected to a ground line GND as a frame ground G like grounding. The positive terminal HP of the high-voltage battery HVBT and the input terminal PP of the power conversion apparatus PWCS are electrically connected by a voltage harness VLP. The negative terminal HN of the high-voltage battery HVBT and the input terminal PN of the power conversion apparatus PWCS are electrically connected by a voltage harness VLN.

When the power conversion apparatus PWCS starts the conversion operation, a current is supplied to the voltage harness VLP from the positive terminal HP of the high-voltage battery HVBT. The current flowing through the positive terminal HP is regarded as being constituted by a normal mode current NMI and a common mode current CMI. Similarly, the current flowing through the negative terminal HN of the high-voltage battery HVBT is regarded as being constituted by the normal mode current NMI and the common mode current CMI. As illustrated herein, the common mode current CMI supplied to the voltage harness VLP and VLN from the positive terminal HP and the negative terminal HN, respectively, passes through the power conversion apparatus PWCS via the input terminals PP and PN, is supplied from the frame ground G to the ground line GND, and is returned to the frame ground G of the high-voltage battery HVBT through the ground line GND. On the other hand, the normal mode current NMI is supplied from the positive terminal HP through the voltage harness VLP to the input terminal PP, and is returned from the input terminal PN to the voltage harness VLN and the positive terminal HN after passing through the power conversion apparatus PWCS.

FIG. 11(B) illustrates a normal mode voltage NMV corresponding to the normal mode current NMI and a common mode voltage CMV corresponding to the common mode current CMI. Since the normal mode current NMI reciprocates between the voltage harness VLP and VLN and returns to the high-voltage battery HVBT, the normal mode voltage NMV corresponds to a potential difference between the voltage harness VLP and VLN. On the other hand, since the common mode current CMI is a current that returns from the voltage harness VLP and VLN to the high-voltage battery HVBT through the ground line GND, the common mode voltage CMV corresponds to a potential difference based on the voltage (ground voltage) of the ground line GND.

As illustrated in FIG. 11(C), a voltage change of the common mode voltage CMV appears as a change in the potential difference with respect to the ground voltage (ground line GND), and a voltage change of the normal mode voltage NMV appears as a change in the potential difference between the voltage harness VLP and VLN.

When noise is generated, harmonic components constituting noise are superimposed on the normal mode current NMI and the common mode current CMI, respectively, and they change according to noise. Similarly, the normal mode voltage NMV and the common mode voltage CMV are superimposed with harmonic components and change.

The inventors measured the noise generated in the power conversion apparatus PWCS by dividing it into a common mode and a normal mode. FIG. 12 is a characteristic diagram illustrating noise frequency characteristics measured by the inventors. In the drawing, the horizontal axis represents frequency and the vertical axis represents peak current value of noise at frequency. In the drawing, the broken line CMIn is a characteristic curve representing the noise of the common mode current, and the solid line NMIn is a characteristic curve representing the noise of the normal mode current. In other words, the characteristic curve CMIn represents a noise component (common mode noise current) in the common mode current CMI superimposed on the basis of the harmonic component of noise. The characteristic curve NMIn represents a noise component (normal mode noise current) in the normal mode current NMI superimposed on the basis of the harmonic component of noise. Note that FIG. 12 corresponds to the noise frequency characteristic illustrated in FIG. 10 when divided into a normal mode noise current and a common mode noise current.

As can be understood from FIG. 12, the normal mode noise current is larger than the common mode noise current in the AM broadcast frequency band and the SW frequency band. Therefore, the inventors have considered that it is important to reduce the normal mode noise current.

PTL 1 describes a power conversion apparatus including a snubber circuit capable of being downsized. However, PTL 1 does not disclose reducing noise in the AM broadcast frequency band and the SW frequency band.

It is an object of the present invention to provide a bus bar structure capable of reducing noise in an AM broadcast frequency band and an SW frequency band, and a power conversion apparatus including the bus bar structure.

The above and other objects and novel features of the present invention will become apparent from the description of this specification with reference to the accompanying drawings.

Solution to Problem

A representative embodiment of the present invention disclosed in the present application will be briefly described below.

In one embodiment, a power conversion apparatus includes a first capacitance unit connected between a positive terminal and a negative terminal of a power source and configured to smooth noise (voltage change) superimposed on a direct current (DC) voltage, a switching circuit configured to convert the DC voltage to an alternating (AC) voltage, a first bus bar electrically connecting between the positive terminal of the power source and a first terminal of the first capacitance unit, a second bus bar electrically connecting between the negative terminal of the power source and a second terminal of the first capacitance unit, and a second capacitance unit electrically connecting between the first bus bar and the second bus bar. Here, the first bus bar and the second bus bar have portions opposing each other (opposing portions), and are arranged so that the current flows in the same direction in the opposing portions.

Advantageous Effects of Invention

An effect obtained by the representative embodiment of the invention disclosed in the present application is briefly mentioned below.

The power conversion apparatus capable of reducing noise in the AM broadcast frequency band and the SW frequency band is provided.

BRIEF DESCRIPTION OF DRAWINGS

FIGS. 3A to 3C illustrate a structure of a bus bar according to the first embodiment.

FIG. 4 illustrates the relationship between the structure of the bus bar and its inductance according to the first embodiment.

FIGS. 7A to 7C illustrate the structure of the bus bar according to the second embodiment.

FIGS. 8A to 8C illustrate a structure of a bus bar according to a third embodiment.

DESCRIPTION OF EMBODIMENTS

Figure 1:
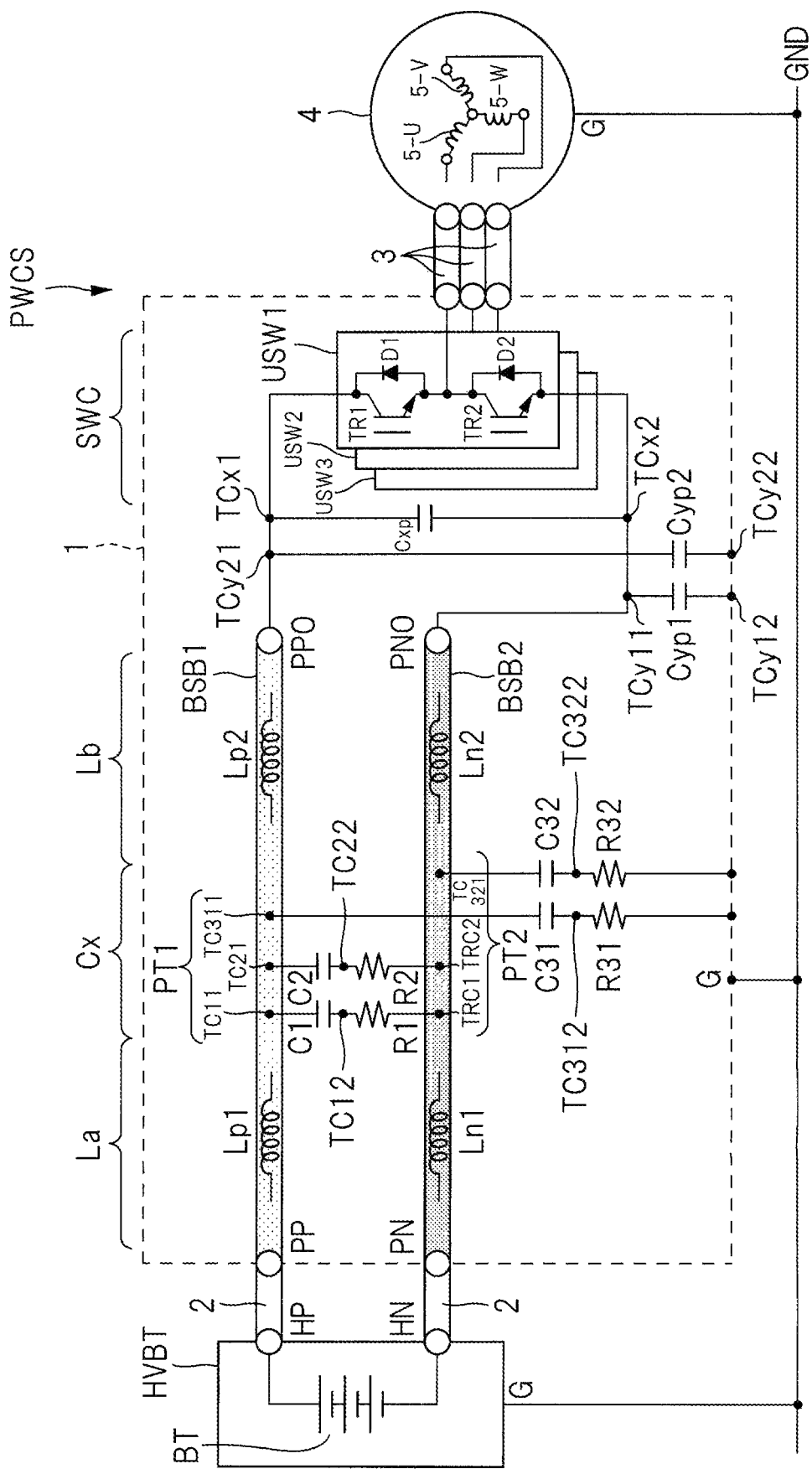
FIG. 1 is a block diagram illustrating a configuration of a power conversion apparatus according to a first embodiment.

Embodiments of the present invention will be described below by referring to the accompanying drawings. In principle, the same reference numerals are attached to the same portions and the description thereof will not be repeated in all drawings that explain the embodiments. Although not restricted in particular, it will be described below by taking a power conversion apparatus mounted in an electric vehicle as an example.

First Embodiment

<Noise Filter>

The inventors have considered to connect a noise filter to a bus bar to reduce noise in the AM broadcast frequency band and the SW frequency band by reducing the normal mode noise current. In other words, it has been considered to connect a capacitance unit to a bus bar electrically connecting between a positive power input terminal of a power conversion apparatus and a switching element, and a bus bar electrically connecting a negative power input terminal and a switching element. In this case, the capacitance unit is constituted by, for example, a capacitance element connected between the bus bars and a capacitance element connected between each bus bar and a frame ground. The bus bars have a parasitic inductor, as the bus bars are constituted by, for example, copper plates. Therefore, the noise filter is formed by the capacitance unit and the inductor of the bus bar.

Figure 13:
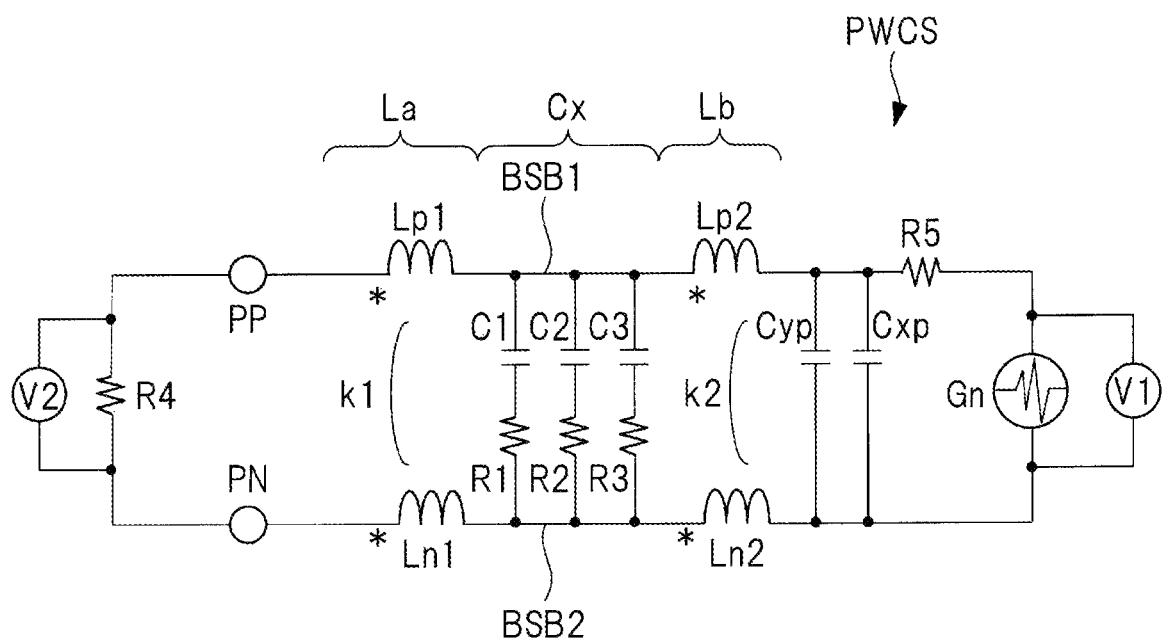
FIG. 13 is a circuit diagram illustrating an equivalent circuit of a noise filter devised by the inventors.

FIG. 13 is a circuit diagram illustrating an equivalent circuit of the noise filter considered by the inventors. This drawing also illustrates a high-voltage battery HVBT and a switching element as equivalent circuits. A power source V2 represents an equivalent circuit of the high-voltage battery HVBT, Gn represents the equivalent circuit of the switching element (switching circuit), and V1 represents the power source formed by conversion by a power conversion circuit PWCS. The power source V2 is a high voltage DC voltage, and the power source V1 is an AC voltage formed by switching of the switching element Gn. Further, resistors R4 and R5 indicate resistors for impedance matching. In the drawing, the switching element Gn is illustrated as a noise generation source.

In FIG. 13, a first bus bar BSB1 connects between an input terminal PP and the switching element Gn of the power conversion apparatus PWCS, and a second bus bar BSB2 connects between an input terminal PN and the switching element Gn of the power conversion apparatus PWCS. A smoothing capacitance element (smoothing capacitance unit) Cxp is connected between the first bus bar BSB1 and the second bus bar BSB2, and smooths a voltage change superimposed on the DC voltage V2 due to noise. A capacitance unit Cyp includes a capacitance element Cyp1 (not illustrated) connected between the first bus bar BSB1 and the frame ground G and a capacitance element Cyp2 (not illustrated) connected between the second bus bar BSB2 and the frame ground G. In the case of a common mode noise current, the capacitance elements Cyp1 and Cyp2 are equivalently connected in series between the first bus bar BSB1 and the second bus bar BSB2. Therefore, the capacitance elements Cyp1 and Cyp2 are depicted as the capacitance unit Cyp connected between the first bus bar BSB1 and the second bus bar BSB2 in the equivalent circuit diagram.

In FIG. 13, the capacitance unit (filtering capacitance unit) Cx constituting the noise filter is connected to predetermined positions of the first bus bar BSB1 and the second bus bar BSB2, respectively. In other words, the capacitance unit Cx is connected to the position between the input terminals PP and PN and the switching element Gn in the first bus bar BSB1 and the second bus bar BSB2. The first bus bar BSB1 is equivalently constituted by two inductors (first and second inductor units) Lp1 and Lp2 about a position where the capacitance unit Cx is connected. Similarly, the second bus bar BSB2 is equivalently constituted by two inductors (third and fourth inductor units) Ln1 and Ln2 about a position where the capacitance unit Cx is connected. Directions in which magnetic fields are generated are indicated by asterisks attached to the inductors Lp1, Lp2, Ln1, and Ln2. A mutual coupling coefficient k1 (hereinafter also referred to simply as a coupling coefficient) is a coupling coefficient between the inductors Lp1 and Ln1, and a mutual coupling coefficient k2 is a coupling coefficient between the inductors Lp2 and Ln2.

The capacitance unit Cx includes capacitance elements C1 to C3 and resistors R1 to R3. Here, the capacitance element C1 and the resistor R1 are connected in series between the first bus bar BSB1 and the second bus bar BSB2. Similarly, the capacitance element C2 and the resistor R2 are also connected in series between the first bus bar BSB1 and the second bus bar BSB2.

The capacitance element C3 includes two capacitance elements C31 (not illustrated) and C32 (not illustrated), and the resistor R3 also includes two resistors R31 (not illustrated) and R32 (not illustrated). The capacitance element C31 and the resistor R31 are connected in series between the first bus bar BSB1 and the frame ground G, and the capacitance element C32 and the resistor R32 are also connected in series between the second bus bar BSB2 and the frame ground G. Similarly to the above-described capacitance unit Cyp, in the case of the common mode noise current, the capacitance element C31, the resistor R31, the capacitance element C32, and the resistor R32 are equivalently connected in series between the first bus bar BSB1 and the second bus bar BSB2. Similarly to the capacitance unit Cyp, therefore, these capacitance elements C31 and C32 and the resistors R31 and R32 are drawn as the capacitance element C3 and the resistor R3 connected in series between the first bus bar BSB1 and the second bus bar BSB2. The resistors R1 to R3 included in the capacitance unit Cx function as a dump resistor for suppressing the peak of noise.

In FIG. 13, a noise filter is formed in which the capacitance unit Cx is sandwiched between the first inductor unit La constituted by inductors Lp1 and Ln1 and the second inductor unit Lb constituted by inductors Lp2 and Ln2. Hereinafter, the filter in which the capacitance unit Cx is sandwiched between the two inductor units La and Lb is also referred to as an LCL filter. Further, it can be regarded that the capacitance unit (referred to as a capacitance unit Cxx for convenience) is constituted by the capacitance unit Cyp and the smoothing capacitance element Cxp. In this case, the first filter circuit is regarded as being constituted by the first inductor unit La and the capacitance unit Cx, and the second filter circuit is regarded as being constituted by the second inductor unit Lb and the capacitance unit Cxx. In this case, the first filter circuit and the second filter circuit are serially coupled in this order between the input terminals PP and PN and the switching element Gn. Hereinafter, such a filter is also referred to as an LCLC filter. With such a filter, it is possible to reduce the normal mode noise current in the AM broadcast frequency band and the SW frequency band.

However, the capacitance of the capacitance element constituting the capacitance unit Cx needs to be increased to reduce the normal mode noise current. Therefore, the capacitance elements C1 to C3 are increased or each capacitance element is constituted by a plurality of capacitance elements. This inhibits the miniaturization of the power conversion apparatus PWCS. It also leads to an increase in the manufacturing cost of the power conversion apparatus PWCS.

Meanwhile, miniaturization and cost reduction are demanded strongly in recent years for the power conversion apparatus mounted on the electric vehicles. Therefore, in order to respond to this request, the inventors further studied the configuration of the power conversion apparatus illustrated in FIG. 13.

According to the study by the inventors, it has been found that, to reduce the normal mode noise current by using the LCL (LCLC) filter, the reduction effect can be obtained by disposing the inductor unit Lb between the capacitance unit Cx and the switching element Gn (or the capacitance unit Cyp and/or the smoothing capacitance unit Cxp). In other words, it has been found that the effect of the LCL (LCLC)

filter for reducing the normal mode noise current can be increased by increasing the inductance of the inductor unit Lb.

Figure 14:
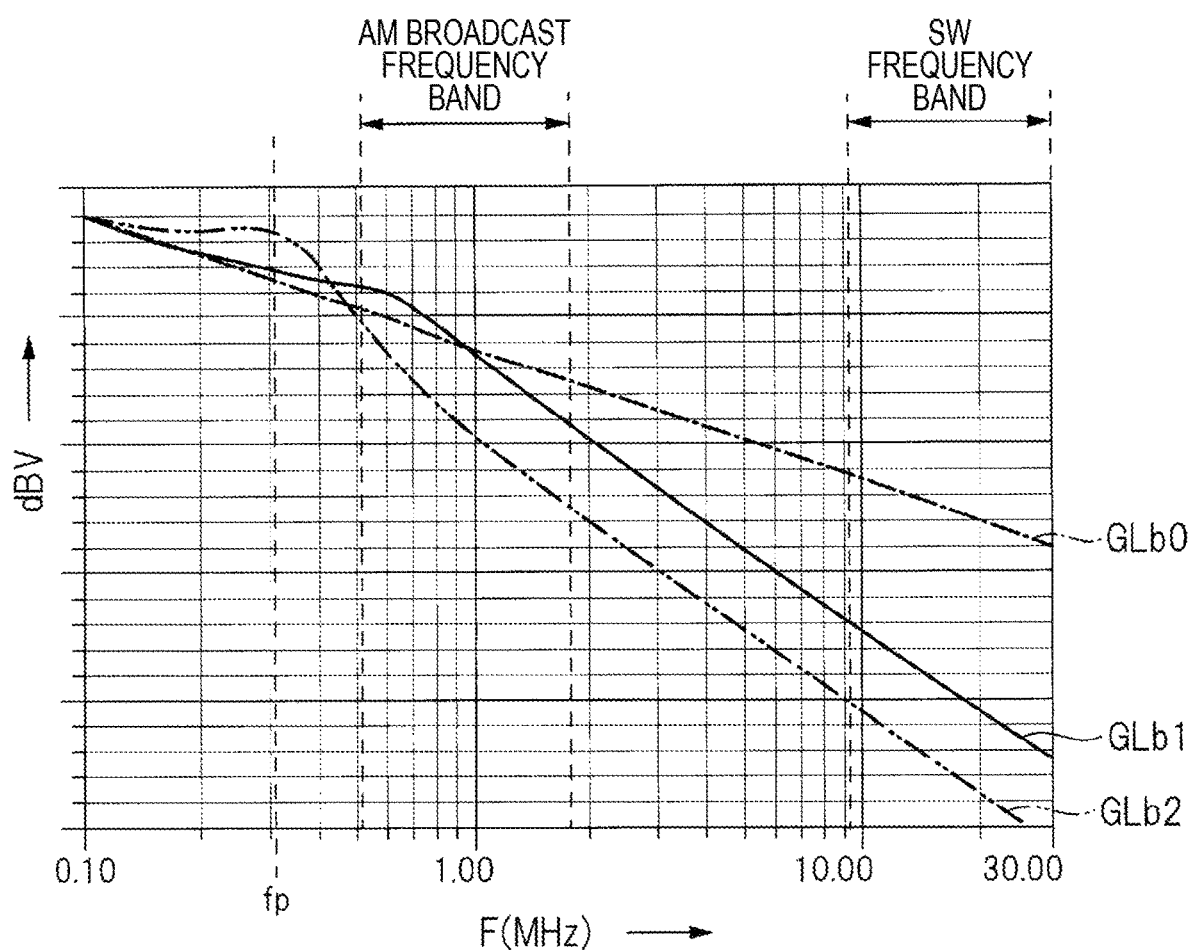
FIG. 14 is a characteristic diagram illustrating an attenuation amount of an LCL filter.

FIG. 14 is a characteristic diagram illustrating the attenuation amount of the LCL (LCLC) filter illustrated in FIG. 13. The horizontal axis represents the frequency F, and the vertical axis represents the ratio of the voltages V1 and V2 illustrated in FIG. 13 in decibels (dBV). A characteristic curve GLb0 indicated by a one-dot chain line represents the change in the attenuation amount with a change in the frequency F, when the inductance of the inductors Lp2 and Ln2 is 0 nH. A characteristic curve GLb1 indicated by a solid line represents the change in the attenuation amount when the inductance of the inductors Lp2 and Ln2 is larger than 0 nH. A characteristic curve GLb2 indicated by a two-dot chain line represents the change in the attenuation amount when the inductors Lp2 and Ln2 having the inductance three times larger than the inductance used in measuring the characteristic curve GLb1 are used. The inductance of the inductor unit La and the capacitance of the capacitance unit Cx are the same in determining the characteristic curves GLb0 to GLB2.

As illustrated in FIG. 14, the attenuation amount increases by increasing the inductance of the inductor unit Lb constituting the LCL (LCLC) filter. In other words, the attenuation amount increases effectively by increasing the value of the inductor unit Lb disposed between the capacitance unit Cx and the capacitance element Cyp and/or the smoothing capacitance unit Cxp among the inductors constituting the LCL (LCLC) filter. The resonant frequency fp can be obtained by Equation (1). In Equation (1), CCx indicates the capacitance of the capacitance unit Cx, and HLb indicates the inductance of the inductor unit Lb.

[Math. 1]

$$fp = 1/2\pi\sqrt{CCx \times HLb} \qquad \text{Equation (1)}$$

To achieve a large attenuation amount in the AM broadcast frequency band and the SW frequency band, values of the capacitance unit Cx and the inductor unit Lb are set so that the resonant frequency fp is smaller than the lowest frequency of 0.52 MHz in the AM broadcast frequency band.

The inductance HLb of the inductor unit Lb can be obtained by Equation (2). HLp2 represents the inductance of the inductor Lp2, HLn2 represents the inductance of the inductor Ln2, and k2 represents the coupling coefficient of the inductors Lp2 and Ln2.

[Math. 2]

$$HLb = HLp2 + HLn2 \pm 2 \times k2\sqrt{HLp2 \times HLn2} \qquad \text{Equation (2)}$$

As understood from Equation (2), the inductance HLb of the inductor unit Lb is a value obtained by adding or subtracting the mutual inductance value, which is obtained by multiplying the product of the inductance HLp2 and HLn2 by the coupling coefficient, to and from the sum of the inductance HLp2 and HLn2 of the two inductors Lp2 and Ln2. Addition or subtraction is determined depending on whether the magnetic fields generated by the inductors Lp2 and Ln2 are in the same direction or opposite directions.

In the first embodiment, each of the inductors Lp2 and Ln2 is regarded as being constituted by a plurality of partial inductors, as will be described later in detail. The first bus bar BSB1 and the second bus bar BSB2 are arranged so as to generate magnetic fields in the same direction in a part of the plurality of partial inductors. This increases the inductance HLb in the inductor unit Lb.

<Power Conversion Apparatus>

FIG. 1 is a block diagram illustrating a configuration of a power conversion apparatus according to the first embodiment. FIG. 1 illustrates a housing 1 of the power conversion apparatus PWCS. Various circuit blocks and elements are stored in the housing 1 to constitute the power conversion apparatus PWCS. Only the elements necessary for explanation among the circuit blocks and elements stored in the housing 1 are illustrated in FIG. 1. Also illustrated in the drawing are a high-voltage battery HVBT for supplying a DC voltage to the power conversion apparatus PWCS and an electric motor 4 driven by an AC voltage formed by the power conversion apparatus PWCS.

The high-voltage battery HVBT includes a battery BT with its positive electrode connected to a positive terminal HP of the high-voltage battery HVBT, and its negative electrode connected to a negative terminal HN of the high-voltage battery HVBT. Although not particularly limited, the housing of the high-voltage battery HVBT is set as a frame ground G and connected to the ground line GND. The positive terminal HP and the negative terminal HN of the high-voltage battery HVBT are electrically connected to the input terminal (positive power source input terminal) PP and the input terminal (negative power source input terminal) PN of the power conversion apparatus PWCS by cables 2.

The electric motor 4 is constituted by, but not limited to, a three-phase electric motor. The electric motor 4 includes a rotor (not illustrated) and a stator (not illustrated), and three coils 5-U, 5-V, and 5-W are arranged on the stator. The power conversion apparatus PWCS generates a three-phase AC voltage and supplies it to the three coils 5-U, 5-V, and 5-W via cables 3. As a result, the coils 5-U, 5-V, and 5-W generate a magnetic field corresponding to the three-phase AC voltage to rotate the rotor. Although not particularly limited, the housing of the electric motor 4 also functions as a frame ground G and is connected to the ground line GND.

Next, the configuration of the power conversion apparatus PWCS is described. The power conversion apparatus PWCS includes a switching circuit SWC, the first bus bar BSB1 and the second bus bar BSB2 which electrically connect between the switching circuit SWC and the input terminals PP and PN, respectively, capacitance elements C1, C2, C31, C32, Cxp, Cyp1, and Cyp2, and resistors R1, R2, R31, and R32.

The switching circuit SWC includes three unit switching circuits USW1 to USW3 which have an identical configuration. The unit switching circuit USW1 is described as an example. The unit switching circuit USW1 includes insulated gate bipolar transistors (hereinafter simply referred to as transistors) TR1 and TR2 and diodes D1 and D2. Diodes D1 and D2 are connected between the collectors and the emitters of the transistors TR1 and TR2, respectively. The emitter of the transistor TR1 is connected to the collector of the transistor TR2. A connection node between the emitter and the collector serves as an output node and is connected to the coil of the electric motor 4 via the cable 3. The collector of the transistor TR1 is electrically connected to the input terminal PP by the first bus bar BSB1 and the emitter of the transistor TR2 is electrically connected to the input terminal PN by the second bus bar BSB2.

A switch control signal from a switching control circuit (not illustrated) is supplied to the gates of the transistors TR1 and TR2, and switching control is performed so that the transistors TR1 and TR2 are complementarily turned on/off according to the switch control signal. When the transistors TR1 and TR2 are complementarily turned on/off, the positive voltage and the negative voltage are periodically output to the output node. In other words, an AC voltage is output from the output node. The same is true for the other unit switching circuits USW2 and USW3, and the description therefor will be omitted. Since the transistors periodically turn on/off as described above, the voltage/current in the first bus bar BSB1 and the second bus bar BSB2 changes and noise is generated.

The first bus bar BSB1 and the second bus bar BSB2 are constituted by, but not particularly limited to, copper plates made of copper, and both ends of the first and second bus bars BSB1 and BSB2 constitute a pair of terminals. One terminal of the first bus bar BSB1 is connected to the input terminal PP of the power conversion apparatus PWCS, and the other terminal PPO is connected to the first terminal TCx1 of the smoothing capacitance element (first capacitance unit) Cxp functioning as a smoothing capacitor, the first terminal TCy11 of the capacitance element Cyp1, and the first terminal TCy21 of the capacitance element Cyp2. The other terminal PPO is also connected to the collector of the transistor TR1 in the unit switching circuits USW1 to USW3.

Similarly to the first bus bar BSB1, one terminal of the second bus bar BSB2 is connected to the input terminal PN of the power conversion apparatus PWCS, and the other terminal PNO is connected to the second terminal TCx2 of the smoothing capacitance element Cxp, the second terminal TCy12 of the capacitance element Cyp1, and the second terminal TCy22 of the capacitance element Cyp2. The other terminal PPO is also connected to the emitter of the transistor TR2 in the unit switching circuits USW1 to USW3.

In FIG. 1, for the ease of seeing the drawing, the other terminals PPO and PNO of the first bus bar BSB1 and the second bus bar BSB2 are illustrated separately from the capacitance elements Cxp, Cyp1, and Cyp2 and the collector and emitter of the transistor, but are not limited thereto. For example, the first bus bar BSB1 and the second bus bar BSB2 extend to the collector of the transistor TR1 and the emitter of the transistor TR2, the other terminal PPO is present at the collector part of the transistor TR1, and the other terminal PPN may be present at the emitter part of the transistor TR2. In this case, the terminals of the capacitance elements Cxp, Cyp1, and Cyp2 are connected to the extended portion. Since the input terminals PP and PN of the power conversion apparatus PWCS are connected to one terminals of the first bus bar BSB1 and the second bus bar BSB2, the input terminals PP and PN are regarded as representing the one terminals of the first bus bar BSB1 and the second bus bar, respectively.

The second terminals TCy12 and TCy22 of the capacitance elements Cyp1 and Cyp2 are connected to the housing 1 and connected to the ground line GND. The smoothing capacitance element Cxp illustrated in FIG. 1 corresponds to the smoothing capacitance element Cxp described in connection with FIG. 13. The capacitance elements Cyp1 and Cyp2 correspond to the capacitance unit Cyp illustrated in FIG. 13, and for the common mode noise current, the capacitance elements Cyp1 and Cyp2 are equivalently connected serially between the first bus bar BSB1 and the second bus bar BSB2.

On the first bus bar BSB1, first terminals TC11, TC21, and TC311 of the filtering capacitance elements C1, C2, and C31 are electrically connected to a portion (first portion) PT1 between the pair of terminals PP and PPO. On the second bus bar BSB2, terminals TRC1 and TRC2 of the resistors R1 and R2 connected to second terminals TC12 and TC22 of the filtering capacitance elements C1 and C2 are connected to a portion (second portion) PT2 between the pair of terminals PN and PNO. In other words, the second terminals TC12 and TC22 of the filtering capacitance elements C1 and C2 are electrically connected to the second bus bar BSB2 via the resistors R1 and R2 at the portion PT2. Similarly, at a portion PT2 of the second bus bar BSB2, the first terminal TC321 of the filtering capacitance element C32 is electrically connected.

Second terminals TC312 and TC322 of the filtering capacitance elements C31 and C32 are connected to the housing via the resistors R31 and R32, respectively, and are connected to the ground line GND. In FIG. 1, the filtering capacitance elements C1 and C2 correspond to the capacitance elements C1 and C2 described in FIG. 13, and the resistors R1 and R2 also correspond to the resistors R1 and R2 described in FIG. 13. Further, the filtering capacitance elements C31 and C32 correspond to the capacitance element C3 described in FIG. 13, and the resistors R31 and R32 correspond to the resistor R3 described in FIG. 13. In other words, for the common mode noise current, the second terminals TC312 and TC322 of the filtering capacitance elements C31 and C32 are equivalently connected via the resistors R31 and R32. Accordingly, the filtering capacitance elements C31 and C32 and the resistors R31 and R32 are equivalently connected in series between the first bus bar BSB1 and the second bus bar BSB2.

Therefore, it can be regarded that the first terminal of the capacitance unit Cx is connected to the first portion PT1 of the first bus bar BSB1, and the second terminal of the capacitance unit Cx is connected to the second portion PT2 of the second bus bar BSB2.

FIG. 1 illustrates a parasitic inductor Lp1 of the first bus bar BSB1 existing between the one terminal PP and the portion PT1 to which the filtering capacitance element is connected. Also illustrated is a parasitic inductor Ln1 of the second bus bar BSB2 existing between the one terminal PN and the portion PT2 to which the filtering capacitance element is connected. Similarly, a parasitic inductor Lp2 of the first bus bar BSB1 existing between the other terminal PPO and the portion PT1 to which the filtering capacitance element is connected is illustrated. Also illustrated is a parasitic inductor Ln2 of the second bus bar BSB2 existing between the other terminal PNO and the portion PT2 to which the filtering capacitance element is connected.

The parasitic inductors Lp1 and Lp2, and Ln1 and Ln2 correspond to the inductors described in FIG. 13. As a result, the capacitance unit (second capacitance element) Cx is constituted by the portions PT1 and PT2, and the inductor units La and Lb are arranged so as to sandwich the capacitance unit Cx.

<Structure of Power Conversion Apparatus>

Figure 2:
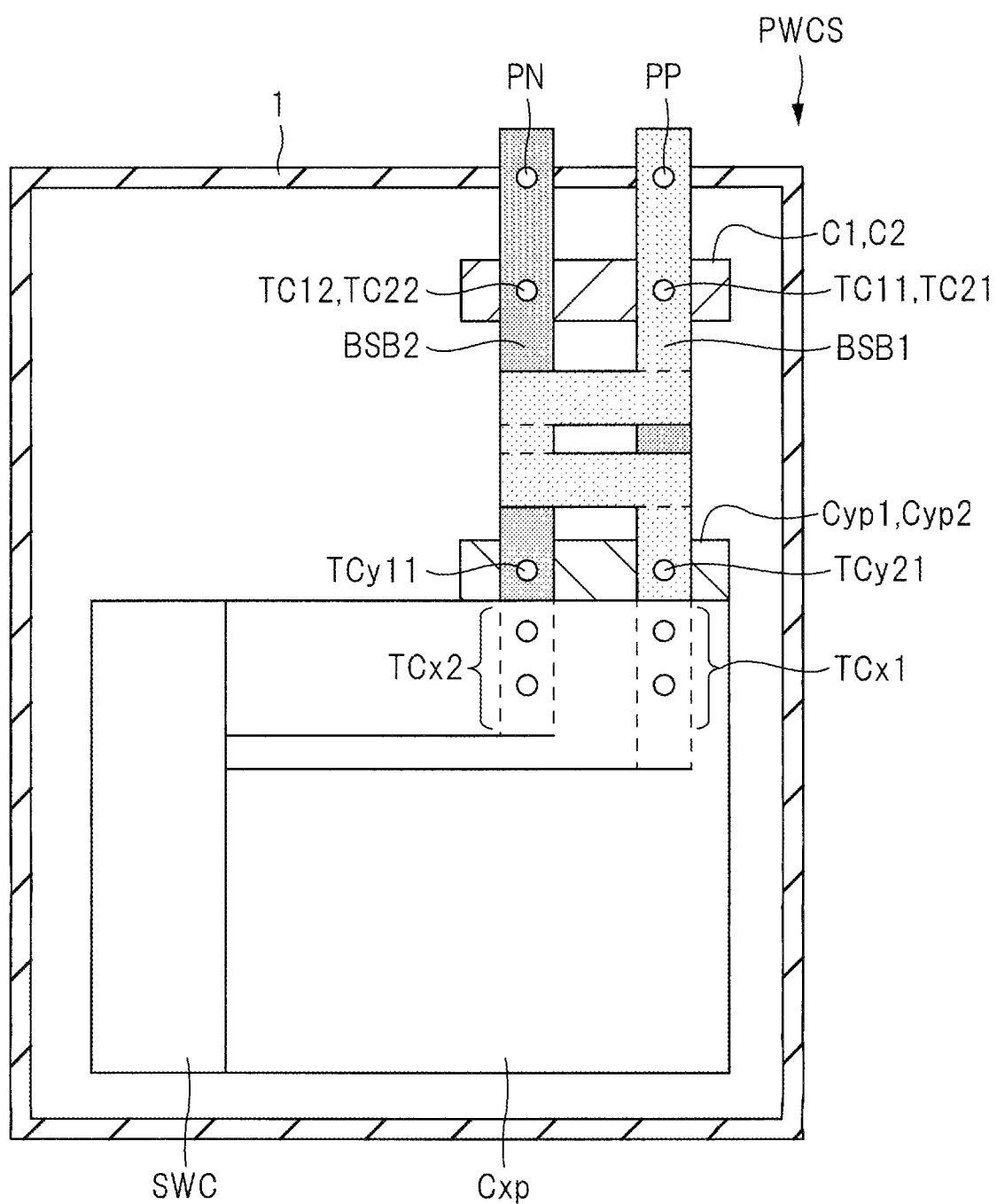
FIG. 2 is a plan view schematically illustrating a structure of a power conversion apparatus according to the first embodiment.

FIG. 2 is a plan view schematically illustrating the structure of the power conversion apparatus according to the first embodiment. Among the circuit blocks and parts stored in the housing 1 of the power conversion apparatus PWCS, the drawing only illustrates the first bus bar BSB1, the second bus bar BSB2, the filtering capacitance elements C1 and C2, the capacitance elements Cyp1 and Cyp2, the smoothing capacitance element Cxp, and the switching circuit SWC, and the other parts are omitted. The shape of the first bus bar BSB1 and the second bus bar BSB2, and the arrangement and shape of the filtering capacitance elements C1 and C2, the capacitance elements Cyp1 and Cyp2, and the smoothing capacitance element Cxp are drawn, although schematically, according to the actual measurements and shapes.

When the power conversion apparatus PWCS is seen from above, the first bus bar BSB1 and the second bus bar BSB2 are each constituted by a flat plate made of a copper material having a predetermined width. In the first embodiment, the main surface of the first bus bar BSB1 extends between the input terminal PP and the smoothing capacitance element Cxp, and has a U-shaped bent portion in the middle. Similarly, the main surface of the second bus bar BSB2 also extends between the input terminal PN and the smoothing capacitance element Cxp, and has a U-shaped bent portion in the middle. When viewed from above, the U-shaped bent portion of the first bus bar BSB1 and the U-shaped bent portion of the second bus bar BSB2 are partially overlapped, and an insulating material is interposed at the overlapped portion. The insulating material corresponds to, for example, a gap between the first bus bar BSB1 and the second bus bar BSB2.

At the portions PT1 and PT2 (FIG. 1) between the bent portions of the first bus bar BSB1 and the second bus bar BSB2 and the input terminals PP and PN, respectively, the first bus bar BSB1 and the second bus bar BSB2 are connected to the capacitance unit Cx (FIG. 1) constituting the noise filter. FIG. 2 only illustrates the filtering capacitance elements C1 and C2 constituting the capacitance unit Cx as one capacitance block, and the one terminals TC11 and TC21 of the filtering capacitance elements C1 and C2 are indicated by circles and connected to the first bus bar BSB1. The other terminals TC12 and TC22 of the filtering capacitance elements C1 and C2 are indicated by circles and are connected to the second bus bar BSB2 via the resistors R1 and R2 (FIG. 1) (not illustrated).

The first bus bar BSB1 and the second bus bar BSB2 are connected to the filtering capacitance elements and the resistors with, but not limited to, metal screws. For example, the portions of the terminals TC11 and TC21 indicated by circles are fixed to the first bus bar BSB1 with screws. This allows the first bus bar BSB1 to be connected electrically to the terminals TC11 and TC21 of the capacitance elements C1 and C2. The terminals TC12 and TC22 indicated by circles are electrically connected to the second bus bar BSB2 by the terminals TRC1 and TRC2 (FIG. 1) of the resistors R1 and R2 being fixed to the second bus bar BSB2 with screws.

Although not illustrated in FIG. 2, the terminals TC311 and TC321 of the filtering capacitance elements C31 and C32 are also connected to the first bus bar BSB1 and the second bus bar BSB2 at the portions PT1 and PT2 at the same positions as the filtering capacitance elements C1 and C2, and are electrically connected with screws. Resistors R31 and R32 (not illustrated) are electrically connected between the housing 1 and the terminals TC312 and TC322 of the filtering capacitance elements C31 and C32.

One of the terminals TCy11 and TCy21 of the capacitance elements Cyp1 and Cyp2 indicated by circles are fixed to the positions between the bent portions of the first bus bar BSB1 and the second bus bar BSB2 and the smoothing capacitance element Cxp with screws and are electrically connected. The other terminals TCy12 and TCy22 of the capacitance elements Cyp1 and Cyp2 are connected to the housing 1.

The smoothing capacitance element Cxp is larger in size than other capacitance elements when viewed from above. Although not particularly limited, the first bus bar BSB1 and the second bus bar BSB2 extend so as to overlap a pair of electrodes of the smoothing capacitance element Cxp. The pair of electrodes of the smoothing capacitance element Cxp includes a plurality of terminals TCx1 and TCx2 indicated by circles, which are fixed and electrically connected to the overlapping first bus bar BSB1 and the second bus bar BSB2 with screws. In addition, the first bus bar BSB1 and the second bus bar BSB2 are electrically connected to the switching circuit SWC. The input terminals PP and PN are fixed and electrically connected to the cables 2 described in FIG. 1 with screws.

FIG. 3 is a diagram illustrating a structure (bus bar structure) of a bus bar according to the first embodiment. FIG. 3(A) is a top view illustrating the structures of the first bus bar BSB1 and the second bus bar BSB2 in detail. FIG. 3(B) is a cross-sectional view taken along line A-A' of FIG. 3 (A), and FIG. 3(C) is a cross-sectional view taken along line B-B' of FIG. 3(A). Between FIGS. 3(A), 3(B), and 3(C), broken lines indicating mutual relations are drawn. In FIG. 3(A), the lengths of the first bus bar BSB1 and the second bus bar BSB2 are drawn shorter than in FIG. 2 for the ease of seeing the drawing. However, the first bus bar BSB1 and the second bus bar BSB2 illustrated in FIG. 3 are identical to those in FIG. 2. Also, in FIG. 3(A), the capacitance elements Cyp1 and Cyp2 and the switching circuit SWC illustrated in FIG. 1 are omitted.

In FIG. 3(A), BW1 indicates a width of the first bus bar BSB1 and BW2 indicates a width of the second bus bar BSB2. As described in FIG. 2, the first bus bar BSB1 and the second bus bar BSB2 have U-shaped bent portions. In FIG. 3(A), the bus bar BSB1 is bent leftward and bent again rightward, while extending from the upper side to the lower side of the drawing, to form a U-shaped bent portion BU1. On the other hand, the second bus bar BSB2 is bent rightward and bent again leftward, while extending from the upper side to the lower side of the drawing in parallel to the first bus bar BSB1, as viewed from above, to form a U-shaped bent portion BU2. The U-shaped bent portions BU1 and BU2 are each regarded as having side portions, when viewed from above, corresponding to the sides of the U shape, a bottom portion corresponding to the base of the U shape and connecting between the side portions, and an opening not connecting the side portions. When regarded like this, the bent portion BU1 formed in the first bus bar BSB1 is in the U-shape having the opening on the right side and the base on the left side, while the bent portion BU2 formed in the second bus bar BSB2 is in the U-shape having the opening on the left side and the base on the right side.

In other words, the U-shaped bent portion BU1 formed in the first bus bar BSB1 and the U-shaped bent portion BU2 formed in the second bus bar BSB2 overlap each other on the sides and are directed opposite to each other, when viewed from above. In other words, in the first embodiment, the bent portion BU1 and the bent portion BU2 are disposed to overlap each other when viewed in a plan view except for the opening portions.

As illustrated in the A-A' cross-sectional view of FIG. 3(B), in the overlapping bent portions BU1 and BU2, between the first bus bar BSB1 and the second bus bar BSB2, an insulating layer ISO2 made of an insulating material is interposed. The housing 1 is made of a metal material. The insulating layer ISO1 is interposed between the second bus bar BSB2 and the housing 1 and an insulating layer ISO2 is interposed between the first bus bar BSB1 and the second bus bar BSB1. Thus, the first bus bar BSB1, the second bus bar BSB2, and the housing 1 are not directly connected each other. In FIG. 3(B), BD1 and BD2 indicate the thickness of the first bus bar BSB1 and the second bus bar BSB2, respectively.

Since the U-shaped bent portions BU1 and BU2 are disposed in the opposite directions in the first embodiment, the opening of one bent portion (e.g., the bent portion BU1) overlaps the base of the other bent portion (BU2), and the sides of both bent portions are overlapped. Thus, as illustrated in FIG. 3(C), the side portions of the U-shaped bent portions BU1 and BU2 overlap each other. The insulating film ISO2 is interposed between the first bus bar BSB1 and the second bus bar BSB2 in the bent portions BU1 and BU2, but is omitted in FIG. 3(C). Since the filtering capacitance elements C1 and C2 and the smoothing capacitance element Cxp are not directly connected to the housing 1, the insulating layer ISO1 is interposed between the housing 1 and the capacitance elements.

The insulating material of the insulating layers ISO1 and ISO2 is not particularly limited. For example, it is only necessary to physically separate the bus bars BSB1 and BSB2 from the housing 1

In the first embodiment, when viewed from above as illustrated in FIGS. 2 and 3, the main surfaces of the first bus bar BSB1 and the second bus bar BSB2 overlap and face each other at the side portions of the bent portions BU1 and BU2, and other portions are not overlapped. Meanwhile, the positive terminal HP is connected to the input terminal PP via the cable 2, and the negative terminal HN is connected to the input terminal PN via the cable 2. Therefore, the normal mode current (and the normal mode noise current) flows in the direction from the input terminal PP to the first bus bar BSB1, the switching circuit SWC, the second bus bar BSB2, and the input terminal PN in this order.

In other words, the normal mode current flows in the direction from the input terminal PP to the terminal TCx1 of the smoothing capacitance element Cxp in the first bus bar BSB1. On the other hand, in the second bus bar BSB2, the normal mode current flows in the direction from the terminal TCx2 of the smoothing capacitance element Cxp to the input terminal PN. Therefore, the normal mode current flows in the direction indicated by a solid line arrow in the bent portion BU1 of the first bus bar BSB1, and in the direction indicated by an arrow in the one-dot chain line in the bent portion BU2 of the second bus bar BSB2. As a result, the normal mode current flows in the same direction in the side portions of the U-shaped bent portions BU1 and BU2.

In contrast, the normal mode current flows from the input terminal PP toward the portion at which the terminals TC11 and TC21 of the filtering capacitance elements C1 and C2 are connected between, for example, the input terminal PP and the portion at which the terminals TC11 and the TC21 are connected in the first bus bar BSB1. At this time, in the second bus bar BSB2, the normal mode current flows from the portion at which the terminals TC12 and TC22 are connected to the input terminal PN. In other words, the normal current flows between the terminals TC11 and TC21 of the filtering capacitance elements C1 and C2 and the input terminal PP in the direction opposite to the normal current flowing between the terminals TC12 and TC22 of the filtering capacitance elements C1 and C2 and the input terminal PN.

FIG. 4 illustrates the relationship between the structure of the bus bar and the inductance according to the first embodiment. In FIG. 4, the value of the inductance measured by the inventors is described. FIG. 4 indicates the inductance values obtained according to the change of structure of the first bus bar BSB1 between the portion to which the terminals TC11 and TC21 are connected and the portion to which the terminal TCx1 is connected, and the change of structure of the second bus bar BSB2 between the portion to which the terminals TC12 and TC22 are connected and the portion to which the terminal TCx2 is connected in FIGS. 2 and 3. In other words, the inductance values of the inductor unit Lb illustrated in FIG. 1 are illustrated. In FIG. 4, to indicate that it is a bus bar portion that corresponds to the inductor unit Lb, the first bus bar is indicated by BSB1(Lb) and the second bus bar is indicated by BSB2(Lb).

In FIG. 4, the "bus bar structure" marked number #1 includes the first bus bar BSB1(Lb) and the second bus bar BSB2(Lb) overlapping such that the main surfaces face each other when viewed in a plan view. In this case, assume that the widths BW1 and BW2 of the first bus bar BSB1(Lb) and the second bus bar BSB2(Lb) are 30 mm, and the length (the portion of the inductor unit Lb of FIG. 1) is 70 mm. The first bus bar BSB1(Lb) and the second bus bar BSB2(Lb) are separated by 3 mm. In addition, the first bus bar BSB1(Lb) and the second bus bar BSB2(Lb) are made of a copper material, and the thicknesses BD1 and BD2 are 1.2 mm. In this case, the "coupling coefficient k2" between the parasitic inductors Lp2 and Ln2 constituting the inductor unit Lb is 0.814. Further, the normal mode current flows in the direction indicated by the solid line arrow in the first bus bar BSB1(Lb), and the normal mode current flows in the direction of the one-dot chain line arrow in the second bus bar BSB2(Lb).

In a "bus bar structure" marked number #2, the first bus bar BSB1(Lb) and the second bus bar BSB2(Lb) are disposed to extend in parallel. The first bus bar BSB1(Lb) and the second bus bar BSB2(Lb) are offset by 3 mm to occupy the same volume as the number #1 "bus bar structure", and the first bus bar BSB1(Lb) and the second bus bar BSB2(Lb) are arranged in a range of 30 mm width and 70 mm length. The first bus bar BSB1(Lb) and the second bus bar BSB2 (Lb) use the same material and thickness as those of the number #1 "bus bar structure", except that widths BW1 and BW2 are 10 mm. In this case, the "coupling coefficient k2" between the parasitic inductors Lp2 and Ln2 is 0.418. Further, the normal mode current flows in the direction indicated by the solid line arrow in the first bus bar BSB1 (Lb), and the normal mode current flows in the direction of the one-dot chain line arrow in the second bus bar BSB2 (Lb).

In the number #1 and #2 "bus bar structures", the normal mode current flowing through the first bus bar BSB1(Lb) and the normal mode current flowing through the second bus bar BSB2(Lb) flow in opposite directions. This reverses the direction of the magnetic field in which the inductors Lp2 and Ln2 are generated in an "equivalent circuit". Accordingly, in Equation (2), the value of the mutual inductance becomes negative and the inductance HLb of the inductor unit Lb decreases. Therefore, the inductance HLb of the inductor unit Lb is 10.4 nH in the number #1 "bus bar structure", and the inductance HLb is 46.8 nH in the number #2 "bus bar structure".

On the other hand, as illustrated in FIGS. 2 and 3, the first bus bar BSB1(Lb) and the second bus bar BSB2(Lb) have the U-shaped bent portions in a "bus bar structure" marked number #3. In the number #3 "bus bar structure", the first bus bar BSB1(Lb) and the second bus bar BSB2(Lb) are disposed also in the range of 30 mm width and 70 mm length, so that the first bus bar BSB1(Lb) and the second bus bar BSB2(Lb) are disposed in the same volume as the numbers #1 and #2. The first bus bar BSB1(Lb) and the second bus bar BSB2(Lb) are separated from each other by 3 mm. The first bus bar BSB1(Lb) and the second bus bar BSB2(Lb) have widths BW1 and BW2 and thicknesses BD1 and BD2, respectively, which are the same as those of the number #2 "bus bar structure". Also, the same copper material is used.

In this case, the normal mode current flows in the same direction at least in the side portions of the U-shaped bent portions. On the other hand, the normal mode current flows in the opposite direction in the portions of the first bus bar BSB1(Lb) and the second bus bar BSB2(Lb) other than the bent portions. In the "equivalent circuit", the parasitic inductor Lp2 of the first bus bar BSB1(Lb) is regarded as including a plurality of partial parasitic inductors (hereinafter also referred to as partial inductors) Lp2-1 to Lp2-3. Similarly, the parasitic inductor Ln2 of the second bus bar BSB2(Lb) can also be regarded as including a plurality of partial inductors Ln2-1 to Ln2-3.

In the "equivalent circuit" of FIG. 4, the portion where the normal mode current flows in the same direction is indicated by a broken line. The partial inductors Lp2-2 and Ln2-2 in the portion surrounded by the broken line generate the magnetic fields in the same direction, as the normal mode current flows in the same direction. Therefore, the mutual inductance has a positive value in this portion. On the other hand, the normal mode current flows in the opposite direction in the partial inductors Lp2-1 and Lp2-3, and Ln2-1 and Ln2-3, a magnetic field is generated in the opposite direction and the mutual inductance takes a negative value. The sum of the mutual inductance values is the mutual inductance of the entire inductors Lp2 and Ln2. Thus, the inductance HLb of the inductor unit L2 can be increased with the bus bar structure of the first embodiment. This corresponds to the decrease of the entire coupling coefficient which is obtained as a sum of the coupling coefficient k2-1 between the partial inductors Lp2-1 and Ln2-1, the coupling coefficient k2-2 between the partial inductors Lp2-2 and Ln2-2, and the coupling coefficient k2-3 between the partial inductors Lp2-3 and Ln2-3. As a result, the inductance of the inductor unit Lb can be increased to 52.2 nH in the number #3 bus bar structure according to the first embodiment.

Further, the first bus bar BSB1(Lb) and the second bus bar BSB2(Lb) are arranged to occupy the same volume in the number #1 to #3 "bus bar structures" illustrated in FIG. 4. In other words, the inductance HLb of the inductor unit L2 can be increased, while preventing the increase of the size. The values of the coupling coefficient k2 and the inductance HLb described in FIG. 4 illustrate the case where the frequency of the normal mode current is 10 Mhz.

Figure 5:
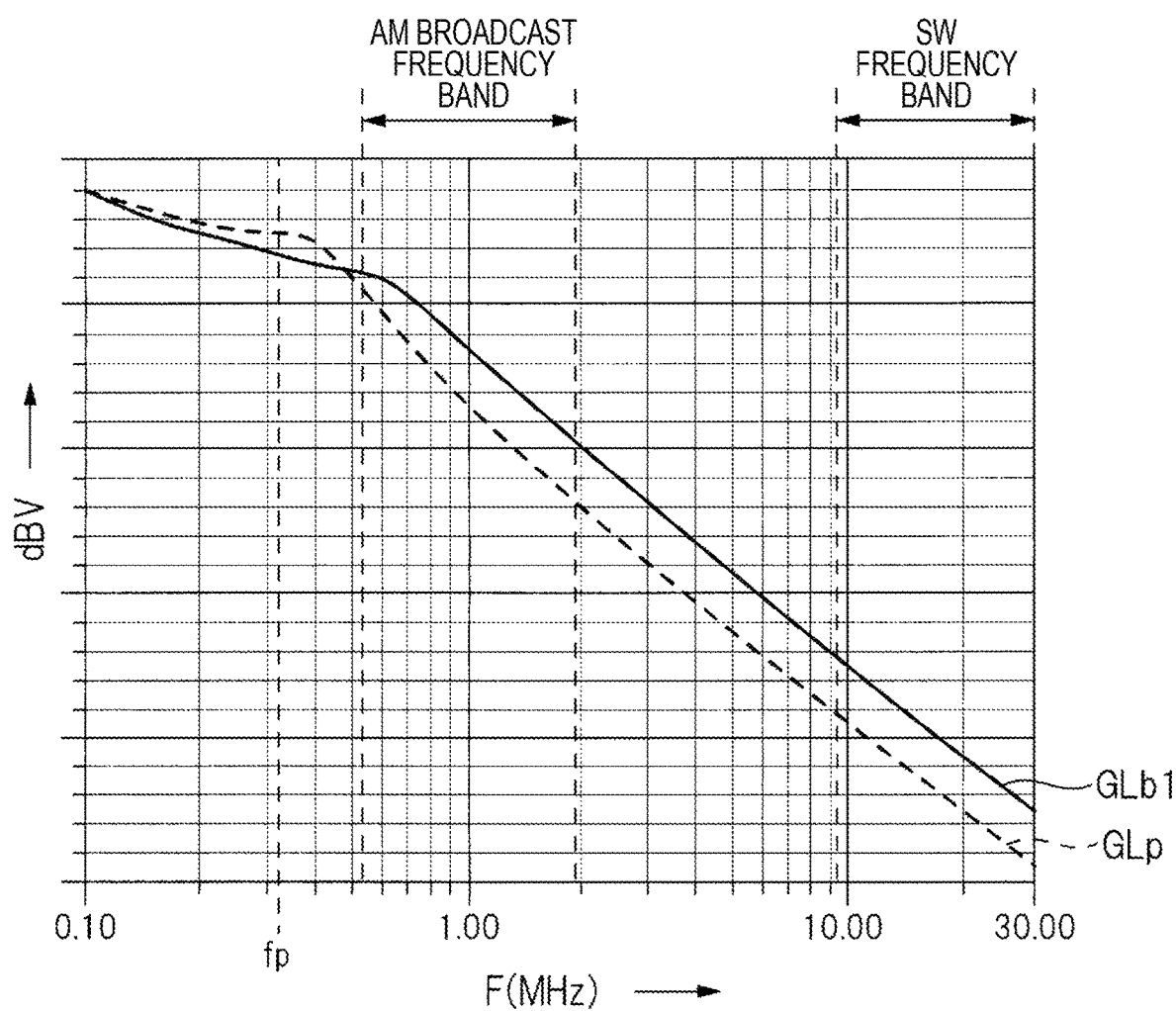
FIG. 5 is a characteristic diagram illustrating an attenuation amount of an LCL filter according to the first embodiment.

FIG. 5 is a characteristic diagram illustrating the attenuation amount of the LCL (LCLC) filter according to the first embodiment. Similarly to FIG. 14, the horizontal axis represents the frequency F, and the vertical axis represents the ratio of the voltage V1 to V2 illustrated in FIG. 13 in decibels (dBV) in FIG. 5.

FIG. 14 illustrates the characteristic in the case where the inductor unit Lb illustrated in FIG. 13 has the number #2 "bus bar structure" in FIG. 4. In FIG. 5, the characteristic curve GLb1 represents the characteristic in the case where the inductor unit Lb is in the number #2 "bus bar structure" in FIG. 4.

As illustrated in FIGS. 2 and 3, the characteristic curve GLp illustrated in FIG. 5 represents a characteristic curve of the LCL (LCLC) filter including the first bus bar BSB1(Lb) and the second bus bar BSB2(Lb) having the opposing portion (the side portions of the U-shape) in which the main surfaces face each other. In other words, the characteristic curve GLp representing the change in the attenuation amount with respect to the frequency in FIG. 13, when the inductor unit Lb is configured as the number #3 "equivalent circuit" in FIG. 4. Here, the first bus bar and the second bus bar occupy the same volume in measuring the characteristic curves GLb1 and GLp.

As described above, the first bus bar BSB1 and the second bus bar BSB2 are disposed such that the normal mode current flows in the same direction in the opposing portion where the main surfaces face each other in the portion forming the inductor unit Lb, whereby the inductance can be increased in the inductor unit Lb. Accordingly, the attenuation amount in the AM broadcast frequency band and the SW frequency band can be increased, while preventing the increase in size. As a result, leakage of noise in the AM broadcast frequency band and the SW frequency band from the power conversion apparatus PWCS can be reduced.

Second Embodiment

Figure 6:
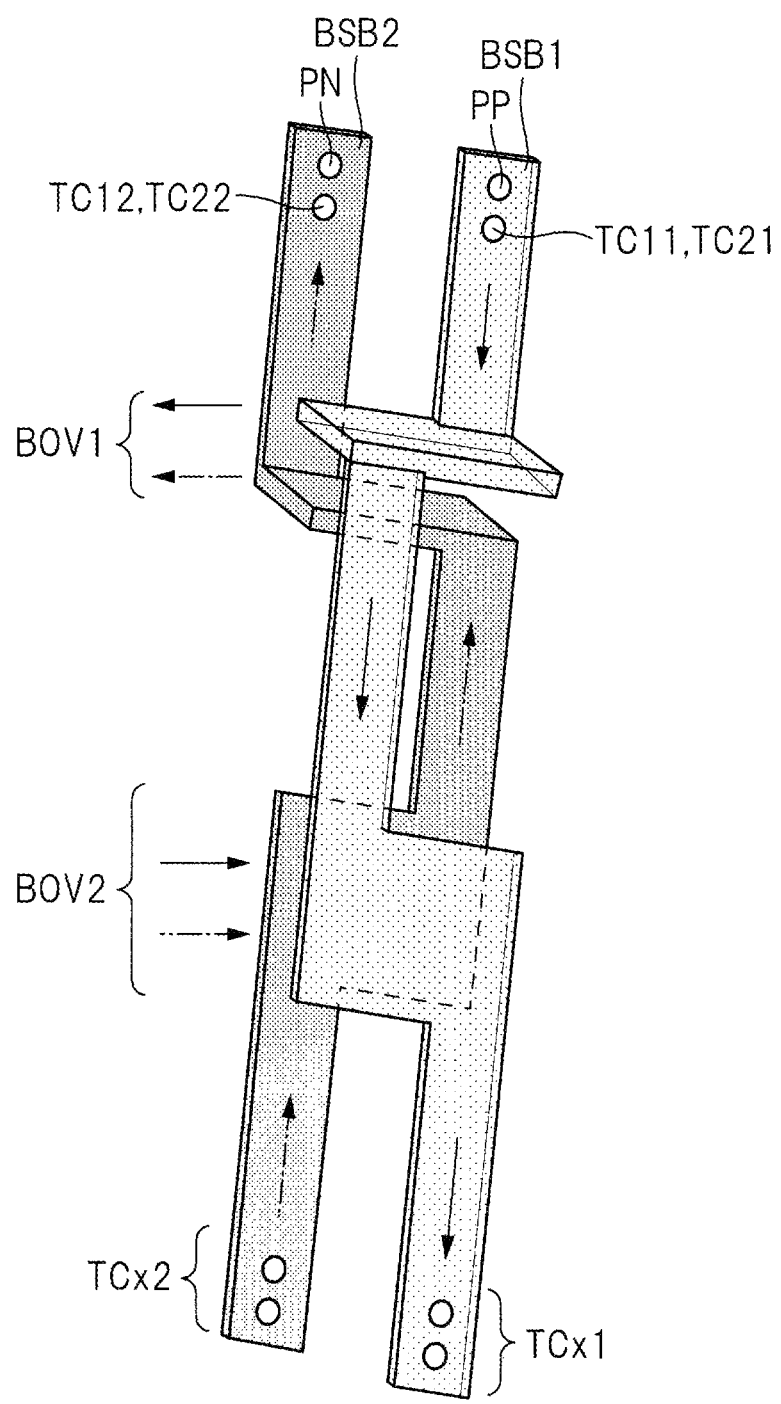
FIG. 6 is a perspective view illustrating a structure of a bus bar according to a second embodiment.

FIG. 6 is a perspective view illustrating a structure of a first bus bar BSB1 and a second bus bar BSB2 according to a second embodiment. In the second embodiment, the first bus bar BSB1 and the second bus bar BSB2 are three-dimensionally arranged, and opposing portion where main surfaces face each other is formed at two portions. In the drawing, a first opposing portion BOV1 and a second opposing portion BOV2 are illustrated.

The first bus bar BSB1 and the second bus bar BSB2 include a first layer portion extending toward the back of the drawing (referred to as a first layer for convenience) and a second layer portion extending toward near side of the drawing (referred to as a second layer for convenience). In the first opposing portion BOV1, an interlayer connecting portion for connecting the first layer portion and the second layer portion is formed. In this embodiment, the interlayer connecting portion of the first bus bar BSB1 and the interlayer connecting portion of the second bus bar BSB2 are arranged to face each other. In the second layer portion of the first bus bar BSB1 and the second bus bar BSB2, the opposing portion BOV2 is formed in a manner that the first bus bar BSB1 and the second bus bar BSB2 overlap and face each other at predetermined position when viewed in a plan view.

As a result, the normal mode current indicated by the solid line arrow flowing through the first bus bar BSB1 and the normal mode current indicated by the one-dot chain line arrow flowing through the second bus bar BSB2 are made to flow in the same direction at the first opposing portion BOV1 and the second opposing portion BOV2. Note that the normal mode current flows in opposite directions in the first bus bar BSB1 portion and the second bus bar BSB2 portion, which extend substantially in parallel in the first layer portion and the second layer portion, respectively.

FIG. 7 illustrates the structure of a bus bar according to the second embodiment. FIG. 7(A) is a top view illustrating the structure of the first bus bar BSB1 and the second bus bar BSB2 illustrated in FIG. 6 in detail. FIG. 7(B) is a cross-sectional view taken along line A-A' of FIG. 7(A), and FIG. 7(C) is a cross-sectional view taken along line B-B' of FIG. 7(A). Between FIGS. 7(A), 7(B), and 7(C), broken lines indicating mutual relations are drawn. In FIG. 7(A), the lengths of the first bus bar BSB1 and the second bus bar BSB2 are drawn shorter than in FIG. 6 for the ease of seeing the drawing as in FIG. 3. However, the first bus bar BSB1 and the second bus bar BSB2 illustrated in FIG. 7 are identical to those in FIG. 6. Since FIG. 7 is similar to FIG. 4, only the difference is mainly described.

As illustrated in FIG. 7(A), the first bus bar BSB1 and the second bus bar BSB2 do not overlap at the opposing portion BOV1, when viewed from above. However, as illustrated in FIG. 7(C), in the opposing portion BOV1, a part of the main surface of the first bus bar BSB1 and a part of the main surface of the second bus bar BSB2 are arranged to face each other. If the normal mode current flows in the same direction through the part of the opposing main surface, the impedance of this portion can be increased.

Further, as illustrated in FIG. 7(B), at the opposing portion BOV2, the first bus bar BSB1 overlaps the second bus bar BSB2, and the main surface of the second bus bar BSB1 opposes the main surface of the second bus bar BSB2. The normal mode current flows in the same direction in the opposing portion, whereby the impedance of this part can be increased.

As in the second embodiment, the interlayer connecting portion may be the bent portion of the first bus bar BSB1 and the second bus bar BSB2. The first bus bar BSB1 and the second bus bar BSB2 are disposed three-dimensionally, whereby an area occupied by the bus bars BSB1 and BSB2 can be decreased when viewed from above.

Third Embodiment

In the first and second embodiments, the first bus bar BSB1 and the second bus bar BSB2 include a plurality of opposing portions, but the embodiments are not limited thereto. A third embodiment provides a bus bar structure including one opposing portion.

FIG. 8 illustrates the structure of a bus bar according to the third embodiment. FIG. 8(A) is a top view illustrating the structure of the first bus bar BSB1 and the second bus bar BSB2. FIG. 8(B) is a cross-sectional view taken along line A-A' of FIG. 8(A), and FIG. 8(C) is a cross-sectional view taken along a line B-B' of FIG. 8(A). Between FIGS. 8 (A), 8(B), and 8(C), broken lines indicating mutual relations are drawn. Since FIG. 8 is also similar to FIG. 4, only the difference is mainly described.

In the third embodiment, the first bus bar BSB1 and the second bus bar BSB2 include L-shaped bent portions BL1 and BL2, respectively, when viewed from above. In other words, as illustrated in FIG. 8(A), the first bus bar BSB1 extends from the upper side to the lower side and is bent to the left side along the way to form an L-shaped bent portion BL1. Thereafter, the first bus bar BSB1 extends downward again and is connected to the smoothing capacitance element Cxp. Meanwhile, the second bus bar BSB2 extends from the upper side to the lower side in parallel with the first bus bar BSB1, and is bent rightward along the way to form an L-shaped bent portion BL2. Thereafter, the first bus bar BSB1 extends downward again and is connected to the smoothing capacitance element Cxp.

As illustrated in FIG. 8(C), main surfaces of the first bus bar BSB1 and the second bus bar BSB2 overlap to face each other in the L-shaped bent portions BL1 and BL2. The normal mode current flows through the first bus bar BSB1 in the direction indicated by the solid line arrow and the second bus bar BSB2 in the direction indicated by the one-dot chain line arrow. The main surfaces of the first bus bar BSB1 portion and the second bus bar BSB2 portion face each other at the bent portions BL1 and BL2, so that the normal mode current flows in the same direction to allow the increase of the inductance in the opposing portion. Accordingly, leakage of noise in the AM broadcast frequency band and the SW frequency band from the power conversion apparatus PWCS can be reduced as in the first embodiment.

According to the third embodiment, further miniaturization can be achieved because there is a small number of bent portions. In the third embodiment, the first bus bar BSB1 is formed on the housing 1 side with respect to the second bus bar BSB2, but the second bus bar BSB2 may be formed on the housing 1 side as in the first and second embodiments.

Fourth Embodiment

The example in which the first bus bar BSB1 and the second bus bar BSB2 include the identical U-shaped bent portion has been described in the first embodiment. However, the first bus bar BSB1 and the second bus bar BSB2 may not have the bent portions of the same shape.

Figure 9A:
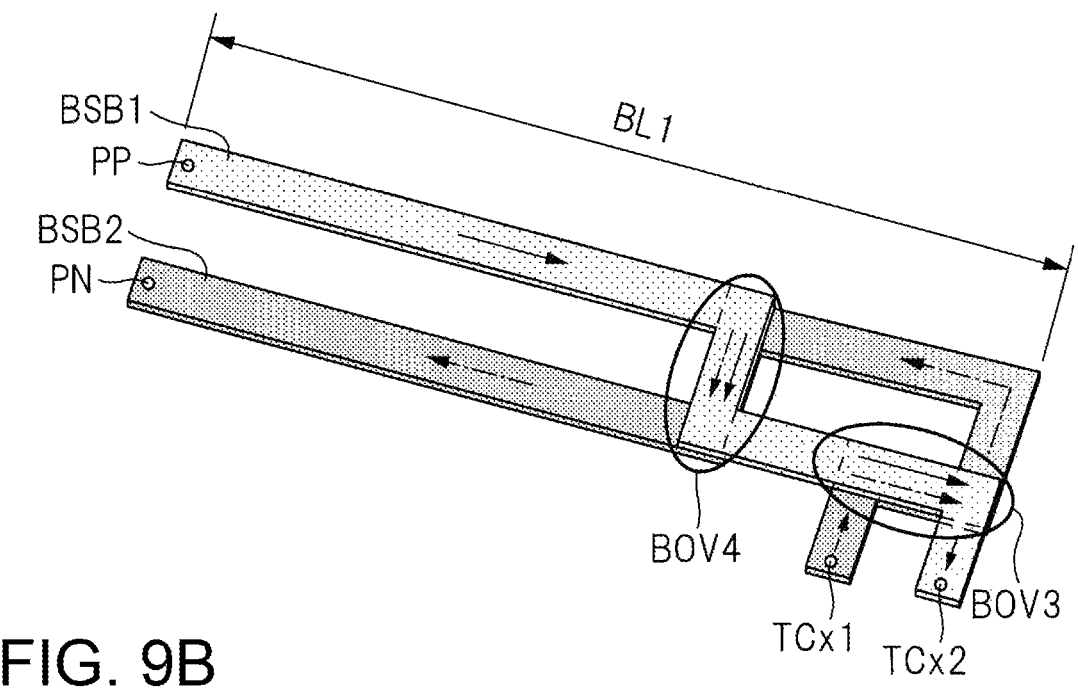
FIGS. 9A and 9B are perspective views illustrating the structure of a bus bar according to a fourth embodiment.

FIG. 9 is a perspective view illustrating the structure of the bus bar according to a fourth embodiment. FIG. 9(A) is a perspective view illustrating the structure of a bus bar in which the first bus bar BSB1 and the second bus bar BSB2 have bent portions of different shapes. In the first embodiment, as illustrated in FIG. 2, the input terminals PP and PN are arranged on the upper side of the housing 1. On the other hand, the input terminals PP and PN are arranged on the left side of the housing 1 illustrated in FIG. 2 in the fourth embodiment.

As illustrated in FIG. 9(A), the first bus bar BSB1 extends rightward from the input terminal PP, which is provided on the left side of the housing 1, and is bent in Z-shape to have a bent portion. After being bent in the Z-shape, the first bus bar BSB1 is connected to the terminal TCx2 of the smoothing capacitance element Cxp. On the other hand, the second bus bar BSB2 extends rightward from the input terminal PN, is bent in the U-shape, and then bent in an L-shape. In this case, a part of the Z-shaped bent part of the first bus bar BSB1 and a part of the L-shaped bent part of the second bus bar BSB2 overlap to form a first opposing portion BOV3 when viewed from above. Also, a part of the Z-shaped bent portion of the first bus bar BSB1 and a part of the U-shaped bent portion of the second bus bar BSB2 overlap to form a second opposing portion BOV4 when viewed from above.

The normal mode currents flowing through the first bus bar BSB1 and the second bus bar BSB2 are in the same direction in the first opposing portion BOV3 and the second opposing portion BOV4, respectively, whereby the inductance of the first opposing portion BOV3 and the second opposing portion BOV4 can be increased. In the fourth embodiment, the normal mode current flows through the first bus bar BSB1 in the direction indicated by the solid line arrow, and the normal mode current flows through second bus bar BSB2 in the direction indicated by the one-dot chain line arrows.

In FIG. 9(A), two opposing portions capable of increasing the inductance are provided, so that the inductance can be increased larger than the case in which one opposing portion is provided. Assume that the lateral length BL1 of the first bus bar BSB1 and the second bus bar BSB2 is, for example, 160 mm, and that the width, thickness, and material of the first bus bar BSB1 and the second bus bar BSB2 are the same as those described with reference to the number #3 in FIG. 4, then the inductance of the first bus bar BSB1 is 126.83 nH, and the inductance of the second bus bar BSB2 is 123.45 nH. The coupling coefficient at this time is 0.36, and the total inductance is 158.4 nH. The frequency of the normal mode current at this time is 10 MHz.

Figure 9B:
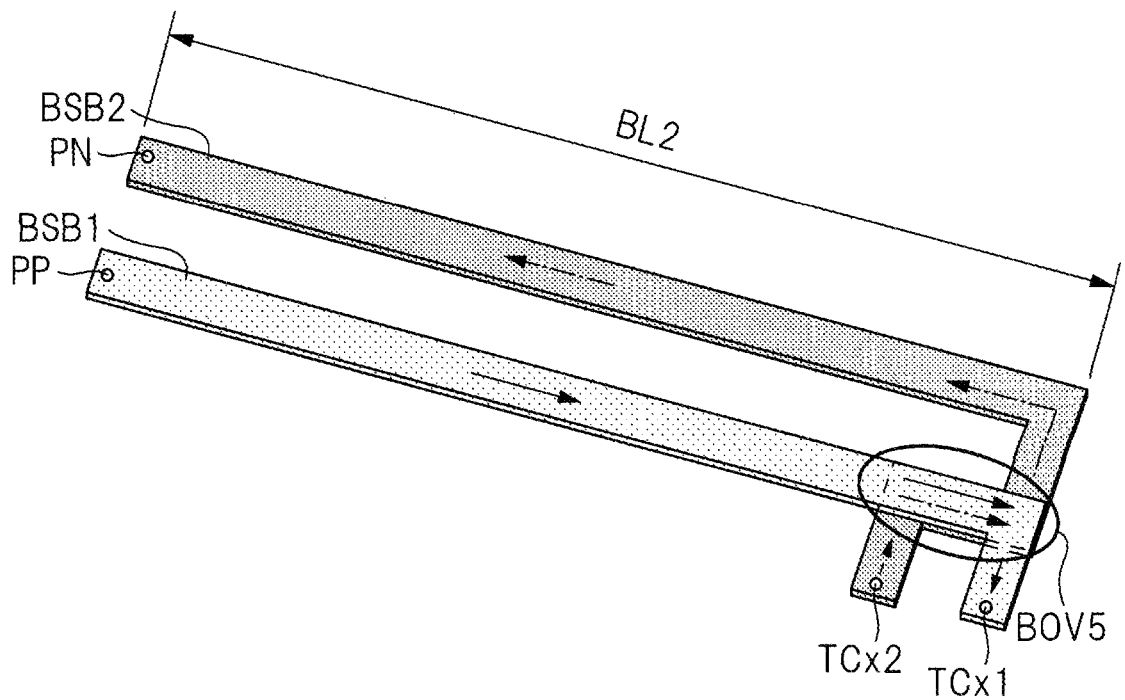
Figure 10:
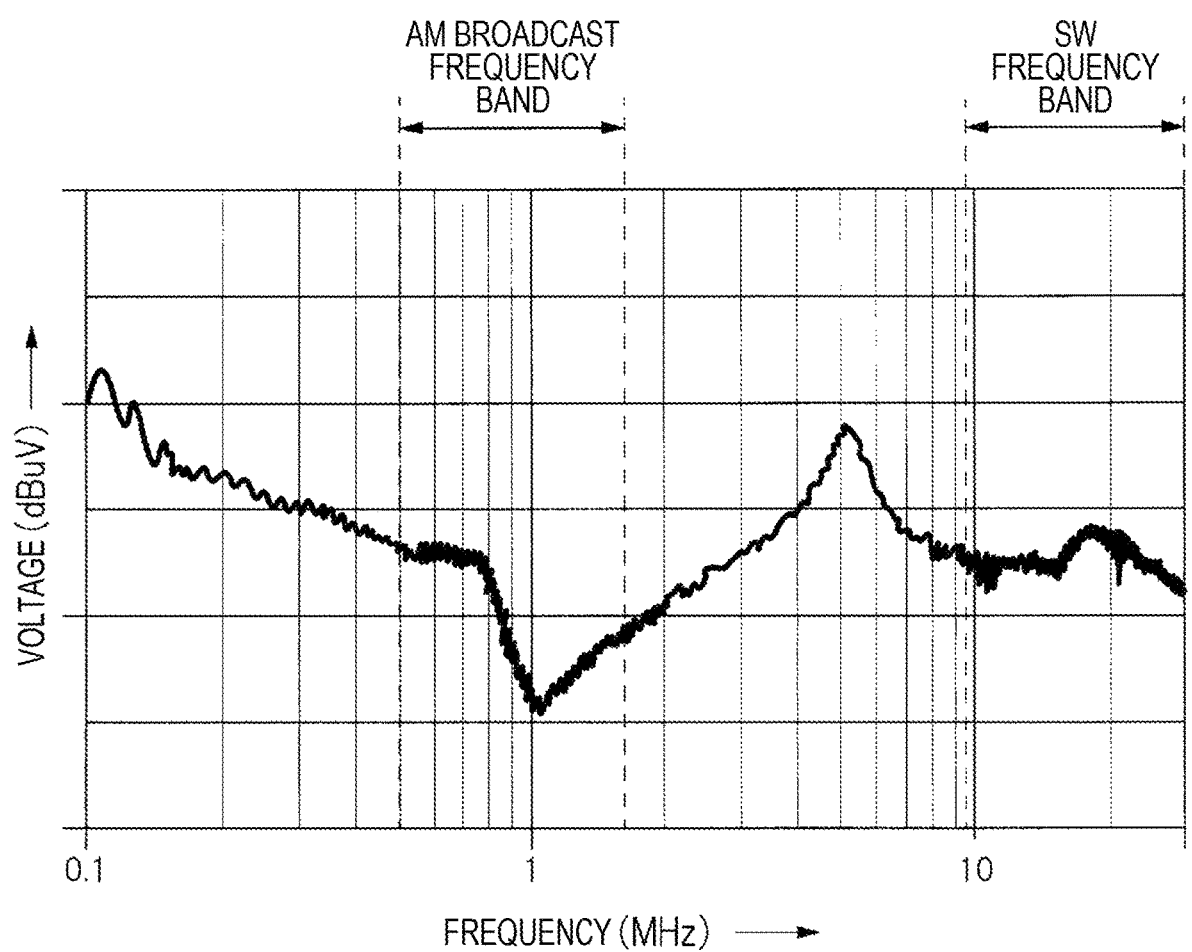
FIG. 10 is a characteristic diagram illustrating noise frequency characteristics measured by the inventors.
Figure 11A:
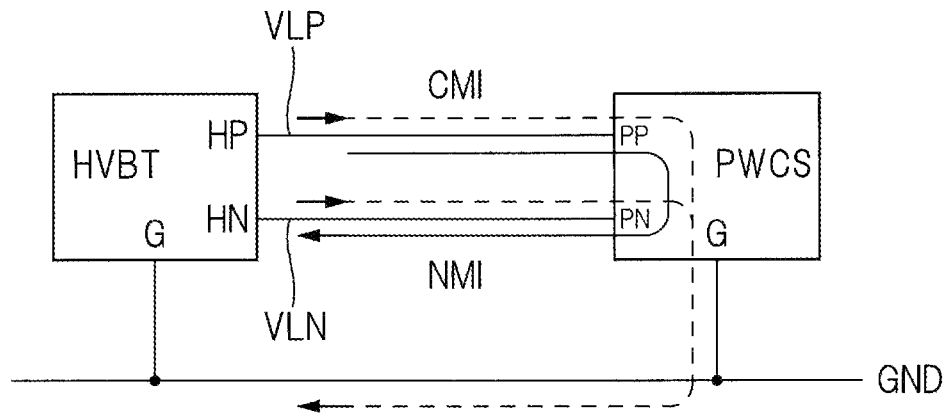
FIGS. 11A to 11C are explanatory diagrams for explaining the study of the inventors.
Figure 11B:
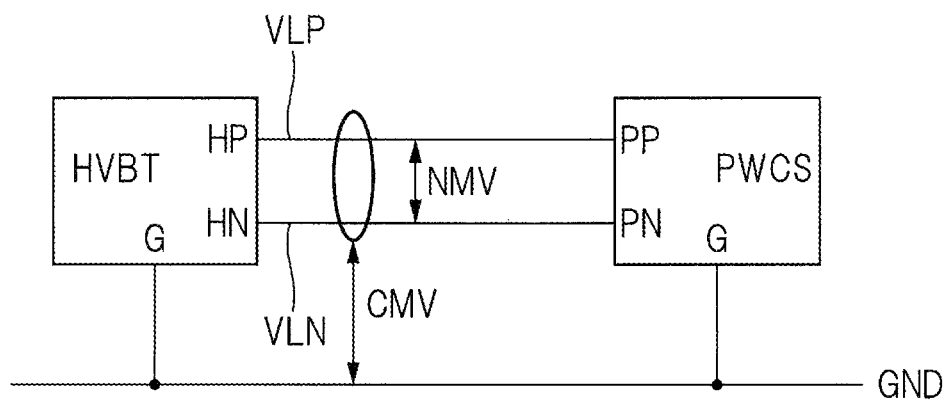
Figure 11C:
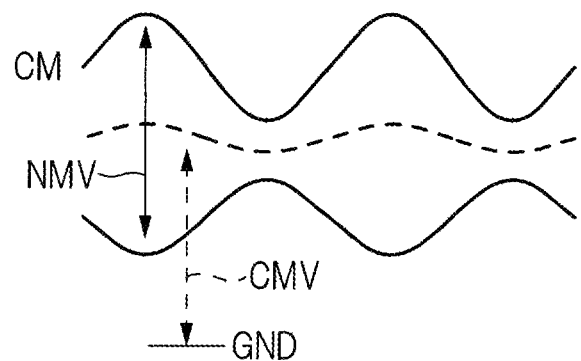
Figure 12:
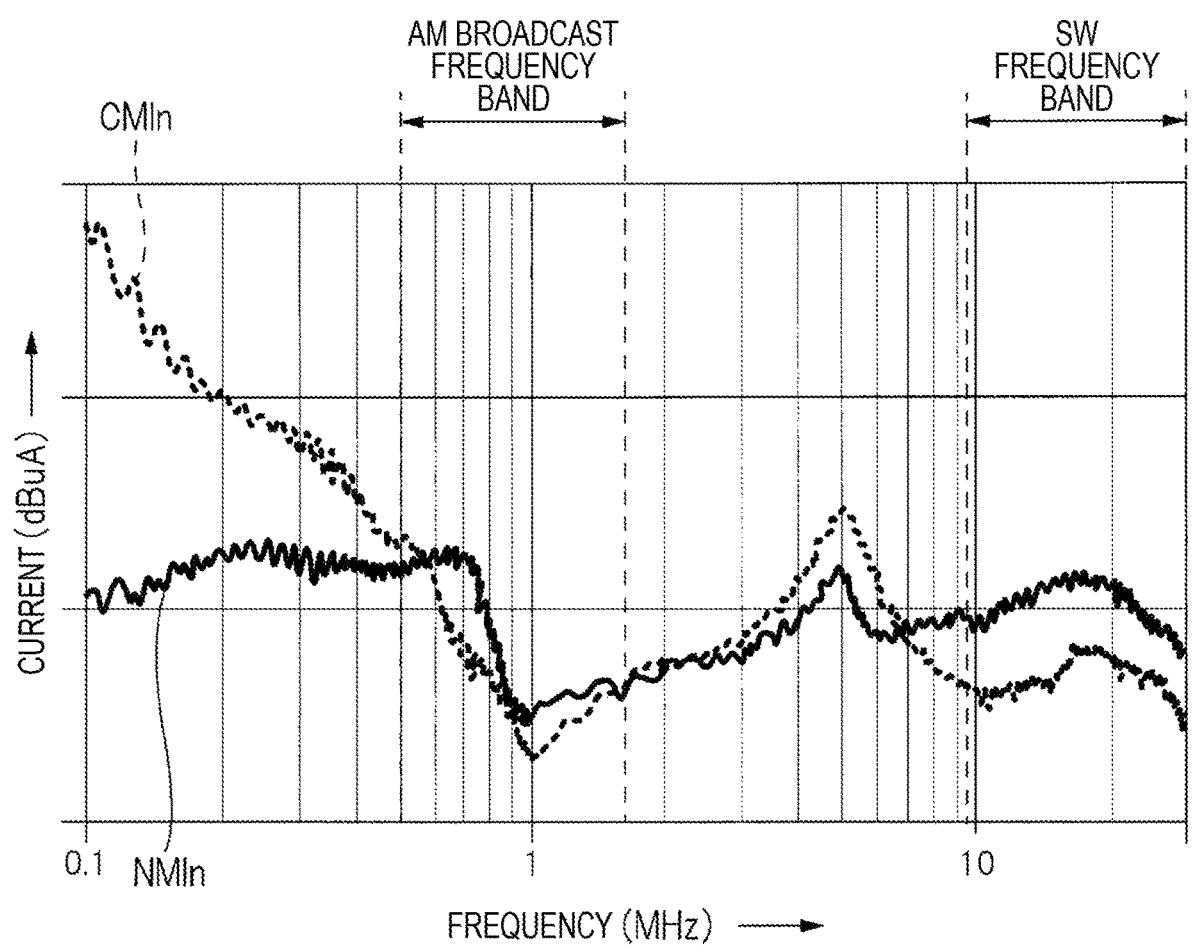
FIG. 12 is a characteristic diagram illustrating noise frequency characteristics measured by the inventors.

FIG. 9(B) illustrates a case where the first bus bar BSB1 and the second bus bar BSB2 have a bend portion such that only one opposing portion is provided. In FIG. 9(B), the first bus bar BSB1 extends rightward and then is bent in an L shape. On the other hand, the second bus bar BSB2 extends rightward, is bent in the L-shape, and further bent in the L-shape. In FIG. 9(B), the L-shaped bent portion of the first bus bar BSB1 and the second L-shaped bent portion of the second bus bar BSB2 partially overlap, when viewed from above, to form the opposing portion BOV5. At the opposing portion BOV5, the normal mode currents flowing through the first bus bar BSB1 and the second bus bar BSB2 flow in the same direction, whereby the inductance can be increased at the opposing portion BOV5.

The first bus bar BSB1 and the second bus bar BSB2 illustrated in FIG. 9(B) have the same width, thickness, and material as those of the first bus bar BSB1 and the second bus bar BSB2 illustrated in FIG. 9(A). To achieve the overall inductance of 158.7 nH as in FIG. 9(A) with the shape illustrated in FIG. 9(B), the lateral length BL2 of the first bus bar BSB1 and the second bus bar BSB2 has to be 176 mm. In other words, the inductance performance is lowered by about 10% as compared with the shape illustrated in FIG. 9(A), because of a small opposing portion, so that the length BL2 of the bus bar is required to be about 10% longer. In other words, miniaturization can be achieved by increasing the opposing portion.

When the frequency of the normal mode current is 10 MHz, the inductance of the first bus bar BSB1 illustrated in FIG. 9(B) is 140.7 nH, and the inductance of the second bus bar BSB2 is 128.6 nH. In this case, the coupling coefficient is 0.41.

Although the invention made by the inventors has been concretely described in accordance with the embodiments, the invention is not limited to the above-described embodiments and, needless to say, various modifications can be made without departing from the scope of the invention. For example, the first bus bar BSB1 and the second bus bar BSB2 may be connected to the terminals of the capacitance elements by soldering or the like, instead of metal screws.

REFERENCE SIGNS LIST 1 housing
2, 3 cable
4 electric motor
BSB1 first bus bar
BSB2 second bus bar
C1, C2 filtering capacitance element
Cxp smoothing capacitance element
HVBT high-voltage battery
SWC switching circuit

The invention claimed is:

1. A power conversion apparatus, comprising:
a first capacitance unit connected between a positive terminal and a negative terminal of a power source and configured to smooth a voltage change superimposed on a DC voltage;
a switching circuit configured to convert the DC voltage into an AC voltage;
a first bus bar electrically connecting between the positive terminal of the power source and a first terminal of the first capacitance unit;
a second bus bar electrically connecting between the negative terminal of the power source and a second terminal of the first capacitance unit; and
a second capacitance unit electrically connected between the first bus bar and the second bus bar, wherein
each of the first bus bar and the second bus bar have two opposing sections that oppose each other and that are arranged such that a direction of a given current through an opposing section of the first bus bar and through an opposing section of the second bus bar is the same, and
the two opposing sections of each of the first and second bus bars respectively form two side portions of a U-shaped portion of each bus bar;
a first power input terminal and a second power input terminal connected to the positive terminal and the negative terminal, respectively, via a cable, wherein
the first bus bar is connected between the first power input terminal and the first terminal of the first capacitance unit, and the second bus bar is connected between the second power input terminal and the second terminal of the first capacitance unit,
the second capacitance unit includes a first terminal connected to a first region between the first power input terminal and the first terminal of the first capacitance unit in the first bus bar, and a second terminal connected to a second region between the second power input terminal and the second terminal of the first capacitance unit in the second bus bar,
the first bus bar includes an equivalent first inductor unit formed between the first power input terminal and the first region and an equivalent second inductor unit formed between the first region and the location at which the first terminal of the first capacitance unit is connected, and
the second bus bar includes an equivalent third inductor unit formed between the second power input terminal and the second region and an equivalent fourth inductor unit formed between the second region and the location at which the second terminal of the first capacitance unit is connected.

2. The power conversion apparatus according to claim 1, wherein
the power conversion apparatus further comprises:
a first filter circuit including the first inductor unit, the third inductor unit, and the second capacitance unit; and
a second filter circuit including the second inductor unit, the fourth inductor unit, and the first capacitance unit and connected to the first filter circuit in series.

3. The power conversion apparatus according to claim 1, wherein
the first bus bar and the second bus bar are disposed in a manner that main surfaces of the first bus bar and the second bus bar face each other.

4. The power conversion apparatus according to claim 3, wherein
the U-shaped portion of each bus bar is disposed in opposite directions and separated to face each other.

5. A bus bar structure, comprising:
a first bus bar and a second bus bar configured to electrically connect between a positive terminal and a negative terminal of a power source and a switching circuit converting a DC voltage to an AC voltage, wherein
each of the first bus bar and the second bus bar have two opposing sections that ops each other and that are arranged such that a direction of a given current through an opposing section of the first bus bar and through an opposing section of the second bus bar is the same,
the two opposing sections of each of the first and second bus bars respectively form two side portions of a U-shaped portion of each bus bar, a first power input terminal and a second power input terminal connected to the positive terminal and the negative terminal, respectively, via a cable, the first bus bar is connected between the first power input terminal and the first terminal of the first capacitance unit, and the second bus bar is connected between the second power input terminal and the second terminal of the first capacitance unit, the second capacitance unit includes a first terminal connected to a first region between the first power input terminal and the first terminal of the first capacitance unit in the first bus bar, and a second terminal connected to a second region between the second power input terminal and the second terminal of the first capacitance unit in the second bus bar, the first bus bar includes an equivalent first inductor unit formed between the first power input terminal and the first region and an equivalent second inductor unit formed between the first region and the location at which the first terminal of the first capacitance unit is connected, and the second bus bar includes an equivalent third inductor unit formed between the second power input terminal and the second region and an equivalent fourth inductor unit formed between the second region and the location at which the second terminal of the first capacitance unit is connected.

6. The bus bar structure according to claim 5, wherein a smoothing capacitance unit configured to smooth a voltage change superimposed on the DC voltage is connected between the first bus bar and the second bus bar.

7. The bus bar structure according to claim 5, wherein the first bus bar and the second bus bar are disposed in a manner that main surfaces of the first bus bar and the second bus bar face each other.

8. The bus bar structure according to claim 7, wherein the U-shaped portion of each bus bar is disposed in opposite directions and separated to face each other.

9. A power conversion apparatus, comprising:
a first bus bar and a second bus bar configured to electrically connect between a positive terminal and a negative terminal of a power source and a switching circuit;
a filtering capacitance unit connected between the first bus bar and the second bus bar; and
a smoothing capacitance unit connected between the first bus bar and the second bus bar wherein
when the current flows from the positive terminal toward the negative terminal of the power source, magnetic fields which extend in a same direction are generated, each of the first bus bar and the second bus bar have two opposing sections that oppose each other and that are arranged such that a direction of a given current through an opposing section of the first bus bar and through an opposing section of the second bus bar is the same, the two opposing sections of each of the first and second bus bars respectively form two side portions of a U-shaped portion of each bus bar, a first power input terminal and a second power input terminal connected to the positive terminal and the negative terminal, respectively, via a cable, the first bus bar is connected between the first power input terminal and the first terminal of the first capacitance unit, and the second bus bar is connected between the second power input terminal and the second terminal of the first capacitance unit, the second capacitance unit includes a first terminal connected to a first region between the first power input terminal and the first terminal of the first capacitance unit in the first bus bar, and a second terminal connected to a second region between the second power input terminal and the second terminal of the first capacitance unit in the second bus bar, the first bus bar includes an equivalent first inductor unit formed between the first power input terminal and the first region and an equivalent second inductor unit formed between the first region and the location at which the first terminal of the first capacitance unit is connected, and the second bus bar includes an equivalent third inductor unit formed between the second power input terminal and the second region and an equivalent fourth inductor unit formed between the second region and the location at which the second terminal of the first capacitance unit is connected.

10. The power conversion apparatus according to claim 9, wherein
the main surface of the first bus bar and the main surface of the second bus bar face each other in that generate the magnetic fields in the same direction.

11. The power conversion apparatus according to claim 10, wherein
the first bus bar and the second bus bar generate magnetic fields in opposite direction, when a current flows from the positive terminal to the negative terminal of the power source.

* * * * *